United States Patent Office 3,717,614
Patented Feb. 20, 1973

3,717,614
LINEAR ELASTIC POLYMERS
Theodor Lyssy, Therwil, Ernst Keller, Binningen, Hansjorg Heller, Riehen, and Helmut Muller, Binningen, Switzerland, assignors to Ciba-Geigy Corporation, Ardsley, N.Y.
No Drawing. Continuation-in-part of application Ser. No. 675,784, Oct. 17, 1967. This application Apr. 6, 1970, Ser. No. 26,047
Claims priority, application Switzerland, Oct. 19, 1966, 15,140/66
Int. Cl. C08g *33/04*
U.S. Cl. 260—77.5         34 Claims

ABSTRACT OF THE DISCLOSURE

Linear elastic polymers are produced from soft-segment forming linear aliphatic dicarboxylic acid derivatives or bis-chloroformates of macroglycols having a molecular weight in the range of from about 400 to 5000 and a melting point of less than 70° C., by capping with certain bis-hydrazides; and reacting the resulting prepolymeric product with, as chain extender, a bifunctional low-molecular compound containing certain groups which are capable of reacting with the hydrazide end groups in the ensuing polymerization reaction, whereby certain aliphatic, aromatic or araliphatic divalent radicals are introduced into the polymer chain.

The resulting polymers are formed from a sequence of recurring units of the formula

—NH—NH—A—NH—NH—Z— wherein A is the central portion of the molecule of the aforesaid bis-hydrazide and Z represents a divalent acyl residue of the aforesaid soft segment former or the chain-extending group —CO—Y—CO—, the final polymer containing per group —CO—Y—CO—, from 0.5 to 5 of the divalent acyl residues of the soft segment former which are distributed statistically over the whole polymer. These novel polymers are useful as material for filaments, films and protective coatings.

CROSS REFERENCE

This is a continuation-in-part of copending application, Ser. No. 675,784 now abandoned.

DESCRIPTION OF THE INVENTION

The present invention concerns a process for the production of linear elastic polymers, the polymers which can be obtained by this process and their use for the production of elastic articles and coatings.

It is known to react polyhydroxyl compounds modified with aromatic di-isocyanates, so as to contain terminal NCO— groups, with diamines in high polar solvents such as dimethyl formamide, whereby there are obtained solutions of essentially linear polymers. However, such polymers which can be shaped into elastic articles, have the drawback that, without the addition of stabilizers, they have relatively little stability to light and/or industrial fumes; indeed, sunlight or irradiation with ultra-violet light and industrial fumes quickly cause yellowing which is often accompanied by a severe decrease in the mechanical properties of the polymers. It is true that with otherwise the same procedure but using aliphatic instead of aromatic di-isocyanates, stabler elastic polymers of similar formation ar obtained; the elastic properties of these elastomers, however, are inferior and in addition the elastomers are more difficultly soluble in the high polar solvents, e.g. dimethyl formamide, which are necessary for their production and shaping. Another disadvantage of polymers produced both with aromatic and/or aliphatic di-isocyanates is that, because there is always a possibility of cross-linking due to the formation of biuret and/or allophanate groups, their solutions tend to gel so that they are technically more difficult to work up.

Furthermore, there is known the reaction of bis-chloroformic acid esters of macroglycols of molecular weights of about 500 to 5000, in solution, with an excess of di-amines—which reaction is often termed "capping" in the industry. The prepolymers obtained by this reaction, which have two terminal primary or secondary amino groups per molecule, are then reacted with bifunctional low-molecular compounds which are capable of reacting with active hydrogen. This latter reaction, which is also known in the industry as "chain extension," produces essentially linear polymers which can be shaped into elastic fibers or films. However, even if filaments spun from the resulting polymeric products could meet the demands of the textile industry, they still suffer from the drawback that they are only slightly soluble or completely insoluble in highly polar solvents such as dimethyl formamide, even when heated, so that the preparation of spinning solutions from these polymers requires the use of acidic, corrosive and physiologically harmful polyamide solvents such as m-cresol or formic acid.

Moreover, since melting points above 170° C., preferably above 200° C., are required of polymers for textile use, there are great difficulties attached to the working up of the last-described known products in the melt due to the well known thermal instability of the urethane grouping in these polymers at temperatures above 200° C., or even at lower temperatures when traces of acid are present. Even a slight thermal degradation of the polymers is sufficient to cause undesirable losses of mechanical properties and is also usually accompanied by discoloration.

It has now been found that surprisingly improved elastic polymers are obtained when soft segment forming linear dicarboxylic acid derivatives or bis-chloroformic acid esters of macroglycols having substantially terminal hydroxyl groups, which soft segment formers have a molecular weight above 400, are capped with bis-hydrazide compounds and the resulting prepolymers are reacted with certain bifunctional low-molecular compounds which are capable of reacting with the hydrazide end groups of the bis-hydrazides.

The present invention, therefore, provides essentially linear elastic polymers having an inherent viscosity of at least 0.5, which consist essentially of a sequence of recurring units of the formula

—NH—NH—A—NH—NH—Z—     (I)

wherein

A represents a divalent acyl radical of a polybasic oxygen acid of carbon optionally containing aliphatic, homo-cyclic or heterocyclic radicals, and Z represents one of the two radicals of the formulas

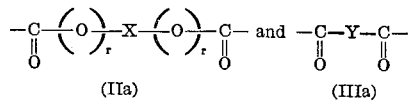

(IIa)                     (IIIa)

wherein

*r* represents 0 or 1,

X represents a divalent, essentially linear, preferably saturated radical which is the residue of a compound

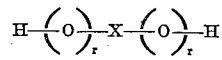

which has a molecular weight of from about 400 to 5000 and a melting point of less than 70° C., and preferably less than 50° C., which radical X is a hydrocarbon radical, a halogenated hydrocarbon radical, an aliphatic polyether radical, an aliphatic polythioether radical, a polyester radical, preferably an aliphatic polyester radical, an aliphatic polyether thioether radical, a polyether ester radical, preferably an aliphatic polyether ester radical, or a polythioether ester radical preferably an aliphatic polythioether ester radical, whereby in the chains X an oxygen group, a sulfur group or the group

is separated from the nearest other such group by at least two chain carbon atoms, any substituents of carbon atoms of said chain being selected from halogen of an atomic number of at most 17 and lower alkyl; and Y represents:

(a) straight-chain alkylene of at most 12 carbon atoms, cycloalkylene of from 5 to 8 carbon atoms, phenylene, diphenylene, naphthylene or phenylene - E - phenylene wherein E is a member selected from —O—, —S—, —SO₂—, alkylidene of at most 8 carbon atoms or cycloalkylidene of from 5 to 7 carbon atoms; any substituents at carbon atoms of the aforesaid groups Y being selected from lower alkyl, halogen of an atomic number of at most 17, or carboxyl; or (b) —O—R'—O— wherein R' represents alkylene of from 2 to 12 carbon atoms or methylene-cyclohexylene-methylene;

(c) 1,4-piperazinediyl; or (d) —NH—R—NH— wherein R represents alkylene of from 2 to 12 carbon atoms, α,α'-xylene, lower alkyl-α,α'-xylylene, halogeno-α,α'-xylylene wherein "halogeno" has an atomic number of at most 17, cyclohexylene or methylenecyclohexylene - methylene; said polymer containing, per radical

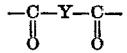

from 0.5 to 5 radicals

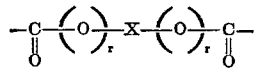

which are distributed at random over the whole polymer.

The invention also provides for the use of the novel polymers in the production of elastic filaments, films and coatings and such filaments, films and coatings produced therefrom.

The term "recurring unit" as used in the instant specification is recognized as meaning that, in the case of asymmetrical structures of such units, as in the present —NH—NH—A—NH—NH—Z— unit, the right hand free bond, e.g. the free bond of Z in the instant case, of a certain unit in the polymer chain, is always linked to the left hand free bond, e.g. the free bond of the terminal —NH— group in the above case, of the next adjacent unit in the chain, and not to the free bond of Z in the latter unit. "Linear" means "in chain form."

"Lower" when used in the instant specification in connection with an aliphatic group such as alkyl or alkoxy means that such group has at most 6 carbon atoms.

In Formula I, A represents the divalent acyl radical of a polybasic oxygen acid of carbon, the term "acid" having the meaning as defined by Brønstedt.

The following acids, for example, are mentioned as yielding acyl radicals suitable for the bis-hydrazides; they can be used for the production of polymers according to the invention: carbonic acid; aliphatic dicarboxylic acid preferably of from 2 to 12 and more especially from 2 to 6 carbon atoms, e.g. oxalic acid to adipic acid and sebacic acid; aromatic carbocyclic dicarboxylic acids such as iso-phthalic acid; heterocyclic dicarboxylic acids such as furan - 2,5 - dicarboxylic acid, thiophene-2,5-dicarboxylic acid, pyridine-2, 5-dicarboxylic acid, also hydroxy acids of azines such as the derivatives of 2,4-dihydroxy-s-triazines, 2,4-dihydroxy-6-monoalkylamino-s-triazines, 2, 4 - dihydroxy-6-dialkylamino-s-triazines, 2,4-dihydroxy-6-alkoxy-s-triazines, 3,5-dihydroxy-1,2,4-triazine, 2,4-dihydroxy - 6 - dialkylamino-1,3-diazines, 2,5-dihydroxy-1,4-diazine, 2,4 - dihydroxy - 5 - chloro - 6-dialkylamino-1,3-diazines, 1,4-dihydroxy-phthalazine and 2,4-dihydroxy-quinazoline.

In addition, also heterocyclic hydroxycarboxylic acids such as 2-hydroxypyrimidino-5-carboxylic acid as well as dihydroxy-compounds the hydroxyl groups of which are at different rings, e.g. hydroxy-di-s-triazines such as N,N'-bis[4 - hydroxy - 6 - dialkylamino-s-triazinyl-(2)]-alkylenediamines or -p-piperazines as well as the analogous diazine compounds can be used as compounds which yield the aforesaid divalent acyl radical A.

In preferred polymers according to the invention falling under Formula I, which can be produced from readily available starting materials, A represents a radical of the formula

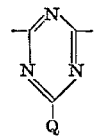 (IV)

wherein

Q represents hydrogen; hydroxy; alkoxy of from 1 to 6 carbon atoms; alkyl of from 1 to 6 carbon atoms; cycloalkyl of from 5 to 8 carbon atoms or a phenyl radical any substituents of which are chosen from lower alkyl, lower alkoxy, halogen of an atomic number of at most 35 and carboxyl; benzyl; a grouping

wherein each of M₁ and M₂ represents, independently of the other, hydrogen, alkyl of from 1 to 18 carbon atoms, benzyl, phenyl, alkenyl of from 3 to 12 carbon atoms, cyclohexyl, or N,N-di-(lower alkyl)-amino-lower alkyl, or wherein M₁ and M₂ taken together with the nitrogen atom to which they are linked, represent morpholino, pyrrolidino, piperidino, 4 - lower alkyl - piperazino, hexamethyleneimino, 10,11-dihydro- 5H-dibenzo[b,f]azepinyl-(5) or thiomorpholino.

In polymers according to the invention which are still more preferred because of their good solubility in organic solvents, especially in those defined further below, Q represents the grouping

in which each of M₃ and M₄ represents an alkyl radical of from 2 to 6 carbon atoms, and more preferably of from 2 to 4 carbon atoms.

X in the moiety of Formula II represents, in particular, a divalent, preferably substantially or fully saturated, aliphatic, hydrocarbon radical; the compound

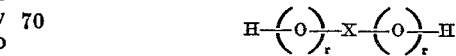

from which it is derived should melt below 70° C., preferably below 50° C. and have a molecular weight of about 400 to 5000, preferably from 800 to 3000.

In the hydrocarbon radical X of preferred polymers at least every twelfth, but at most every second methylene group should be replaced by one of the groups:

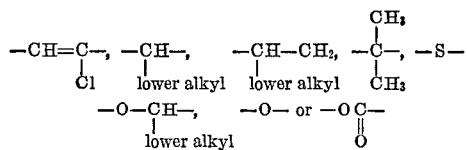

X in the compound

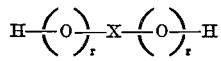

being free from the atomic sequences C—S—C—S—C, C—S—C—O—C and C—O—C—O—C, and any asymmetrical carbon atoms in X being statistically distributed.

In particular, X is a pure hydrocarbon radical such as the radical of acetic polypropylene or the radical of polyisobutylene.

X, however, can also be a halogenated hydrocarbon radical, halogen being fluorine or chlorine.

Moreover, X can be a polyether, preferably polyglycolether radical such as the radicals of homopolymer produced in a known manner from ethylene glycol, propylene glycol, tetramethylene glycol, hexamethyl glycol as well as mixed polymers of the glycols mentioned.

In addition, X can symbolize polythioether radicals of polythioethers produced by known processes, e.g. such as are obtained by condensing thiodiglycol with itself or with other polyalcohols.

As examples of suitable polyester radicals which are symbolized by X are mentioned the radicals of the polyesters which are produced from aliphatic dicarboxylic acids such as adipic acid, glutaric acid, trimethyl-adipic acid, pimelic acid, azelaic acid, sebacic acid, isosebacic acid (mixture of $C_{10}$ dicarboxylic acids), cycloaliphatic dicarboxylic acids such as 1,3- or 1,4-cyclohexanedicarboxylic acid, aromatic dicarboxylic acids such as terephthalic acid or isophthalic acid, and aliphatic glycols such as ethylene glycol, 1,2- or 1,3-propylene glycol, 2,2-dimethyl propane-diol- (1,3), 1,3- or 1,4-butane-diol, pentane-diol, hexane-diol, methylhexane-diol or mixtures thereof, as well as from cyloaliphatic glycols such as 1,3- or 1,4-cyclohexane-diol, 1,3- or 1,4-bis-hydroxymethyl-cyclohexane. The aliphatic dicarboxylic acids used for the production of the polyesters mentioned can also contain hetero atoms in the chain, as in the case of thiodipropionic acid or hydroxydipropionic acid.

Other ester radicals which can be used for X are those derived from ε-caprolactone polymers such as are described in U.S. Pat. No. 3,186,971. The radicals of the following polyether esters are mentioned as examples of suitable polyether ester and polythioether ester radicals. They can be obtained by known processes from the dicarboxylic acids mentioned above and polyether diols such as diethylene glycol, triethylene glycol, polyethylene glycol ether, polypropylene glycol ether, polytetramethylene glycol ether, polyhexamethylene glycol ether and mixed polymers thereof.

Of the polyether thioether radicals which X can represent, those derived from the polyoxathia-alkylene glycols of U.S. Pat. No. 3,044,987 and Swill Pat. No. 404,959, were found to be especially suitable. The polyoxathia-alkylene glycols disclosed in said Swiss patent are 3,3'-dioxydipropylsulfide, 4,4'-dioxydibutylsulfide and reaction products of thiodiglycol and 1,4-butylglycol, 1,6-hexanediol, trimethylolpropane and ethyleneglycol.

In preferred compounds according to the invention, especially those in which A is of the structure given in Formula IV, X represents a divalent linear aliphatic polyether radical, an aliphatic polyester radical or an aliphatic polyether polyester radical, which consist of a terminal alkylene group of from 2 to 14 carbon atoms and a chain of $m$ identical or different recurring units selected from

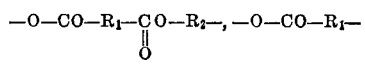

and

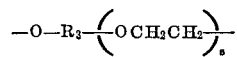

said chain being linked to said terminal alkylene group via its terminal oxygen atom, $R_1$ represents an alkylene radical of from 4 to 12 carbon atoms, while $R_2$ is an alkylene radical having from 2 to 14 carbon atoms at least two of which are in the said chain, $R_3$ is selected from the group —$(CH_2)_g$—;

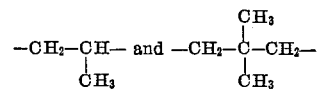

$g$ is an integer ranging from 3 to 6;
$s$ represents 0 or 1; and
Y has the same meaning as in Formula I,
$m$ being an integer of such magnitude that a glycol consisting of —X— and two terminal hydroxyl groups has a molecular weight of from about 400 to 5000, the melting point of said glycol being below 70° C.; such preferred polymers containing, per radical

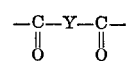

from 0.8 to 5 radicals

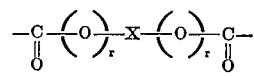

which are distributed at random over the whole polymer.

These polymers are readily produced because of the good solubility of their starting materials in organic solvents, and they are themselves particularly suitable for spinning into filaments because they form stable spinning solutions with practically no tendency to gel.

In the polymers of Formula I, Y in the grouping of Formula IIIa represents more in particular a straight or branched chain alkylene radical having 1 to 12 carbon atoms such as the methylene, 1,2-ethylene, 1,2- or 1,3-propylene, 1,4-butylene, 1-methylbutylene-(1,4), 2-methylbutylene-(1,4), 1,1,3-trimethylbutylene-(1,4), 1,3,3-trimethylbutylene-(1,4), 2-tert.butylbutylene-(1,4), 1,6-hexylene, 1,8-octylene, 1,12-dodecylene radical, a cycloalkylene radical having 5 to 8 carbon atoms such as a cyclopentylene or cyclohexylene radical, a phenylene radical, a phenylene-E-phenylene radical in which E has the aforesaid meaning, e.g. a diphenylene ether radical, a diphenylene thioether radical, a diphenylene sulfone radical, a geminal diphenylene alkane radical of at most 20 carbon atoms, i.e. the alkylidene moiety thereof containing from 1 to 8 carbon atoms, a geminal diphenylene cycloalkane radical having 17 to 19 carbon atoms, i.e. from 5 to 7 carbon atoms in the cycloalkylidene moiety thereof, a diphenylene radical or a naphthylene radical, the aromatic nuclei of which can have substituents which do not disturb the polycondensation, e.g. fluorine, chlorine, alkyl radicals having 1 to 5 carbon atoms, preferably 1 to 3 carbon atoms such as methyl, ethyl, propyl, isopropyl groups as well as carboxyl groups. Y can also represent a divalent radical of a diaminoalkane —HN—R—HN— or of a glycol —O—$R_1$—O—, wherein R and $R_1$ have the above-given meanings.

More preferred among the polymers falling under Formula I because of their good spinning properties as well as mechanical properties are those polymers falling under that formula in which Q in Formula IV represents the above-defined preferred grouping

Z represents one of the two radicals of the formulas

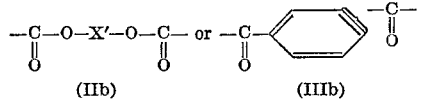

wherein

X' represents a divalent linear aliphatic polyether radical, an aliphatic polyester radical or an aliphatic polyether ester radical, which consists of a terminal alkylene group of from 2 to 14 carbon atoms and a chain which consists of $m$ identical or different recurring units selected from

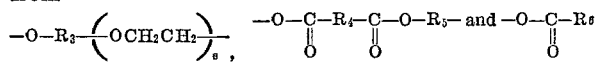

said chain being linked to said terminal alkylene group via its terminal oxygen, atom, and $R_3$, $m$ and $s$ having the aforesaid meanings, while $R_4$ represents alkylene of from 4 to 12 carbon atoms at least 4 of which are members of said chain, $R_5$ represents

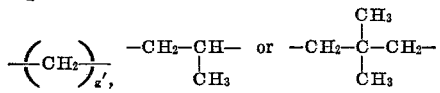

$R_6$ represents alkylene of from 5 to 11 carbon atoms at least 5 of which are members of said chain; and $g'$ represents an integer ranging from 2 to 12; said preferred polymers containing, per radical

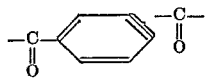

from 1 to 5 radicals

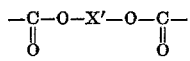

which are distributed at random over the whole polymer. The symbol

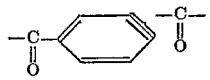

used in the instant specification means the groups

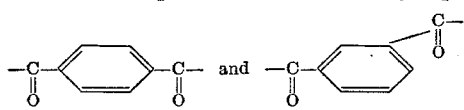

Among the latter sub-class of polymers according to the invention, those polymers which consist essentially of recurring units of the formula

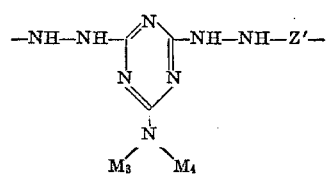

in which formula each of $M_3$ and $M_4$ represents an alkyl radical of from 2 to 6 carbon atoms, Z' represents one of the two radicals of formulas

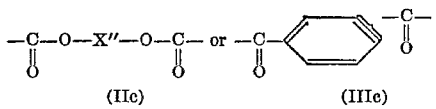

wherein

X" represents a linear divalent polyglycolether radical which consists of a terminal alkylene group of from 2 to 14 carbon atoms and a chain which consists of $m'$ identical or different recurring units —O—$R_3$—, said chain being linked to said terminal alkylene group via its terminal oxygen atom, and $R_3$ having the aforesaid meaning;

$m'$ being an integer of such magnitude that each glycol consisting of —X"— and two terminal hydroxyl groups has a molecular weight of from 800 to 2500 preferably 2000 and a melting point below 70° C., and preferably below 50° C.;

and which polymers contain per radical

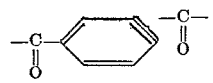

from 1 to 3 radicals

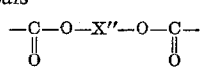

which are distributed at random over the whole polymer, are more particularly preferred because they are distinguished among the preferred polymers described hereinbefore, by low stress decay and good elastic recovery.

An optimal combination of the above-mentioned workability and mechanical properties is found in polymers according to the invention which consist essentially of recurring units of the formula

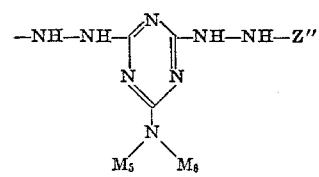

wherein each of $M_5$ and $M_6$ represents a straight alkyl chain of 2 to 4 carbon atoms, such as ethyl or propyl, and Z" represents one of the two radicals of formulas

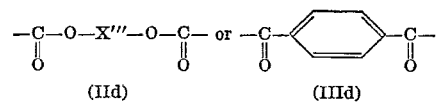

wherein

X'" represents a linear divalent polyether radical which consists of a terminal alkylene group of from 2 to 14 carbon atoms, preferably —(CH₂)4— and a chain which consists of $m'$ identical or different recurring units selected from

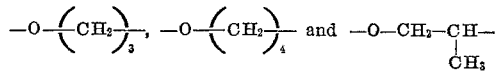

said chain being linked to said terminal alkylene group via its terminal oxygen atom, and $m'$ having the aforesaid meaning; said polymer, containing per radical

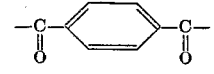

from 1 to 2.5, preferably 1 to 2, and most preferred 1 to 1.5

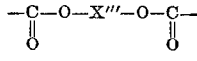

radicals: which are distributed at random over the whole polymer. Mol ratios of the radicals

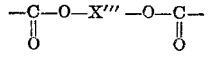

to the radical

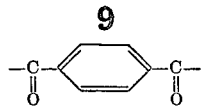

are for example 2:1 and 3:2.

The process for the production of the polymers according to the invention comprises the following steps (I) reacting A bis-hydrazide (i) of a polybasic oxygen acid of carbon free from or containing aliphatic, carbocyclic or heterocyclic radicals and corresponding to the formula $$H_2N-NH-A-NH-NH_2 \quad (V)$$

wherein A has the same meaning as in Formula I, as a capping agent, with

A bis-acid halide (ii) of the formula

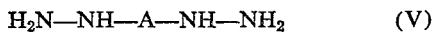
(VI)

wherein Hal represents a halogen atom and X, and $r$ have the same meanings as in Formula IIa, in an organic solvent for at least one of (i) and (ii) and for the resulting polymerizate and inert to these substances, at a temperature ranging from $-20$ to $+100°$ C., and in a molar ratio of (i):(ii) which ranges from about 3:1 to 1.2:1, and (II) reacting The resulting mixture (iii) of bis-hydrazides each of which falls under the formula

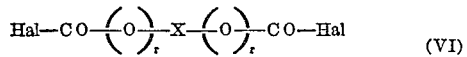
(VII)

wherein $n^*$ represents a number out of the series of whole numbers consisting of zero and the natural numbers, the sum over all $n^*$'s being of course equal to the total number of molecules of the compound VI supplying the moiety X introduced into the reaction, and the arithmetic mean of all $n^*$, referred to hereinafter also as the stoichiometrical number $n$, being equal to a number in the range of from 0.5 to 5, with, as chain-extending agent, A bifunctional compound (iv) consisting of a central moiety Y as defined under (a), (b) or (c) following Formula IIIa, or a moiety that is converted to such Y by the ensuing reaction, and two terminal groups linked to different carbon atoms of said Y, which terminal groups are selected from the monovalent grouping —CO— halogen, which is linked via its free bond to a carbon atom of said central moiety, and the divalent grouping

—CO—O—CO— which is linked either with both free bonds to the same, or with each free bond to a different carbon atom of said central moiety; or with A bifunctional compound (iv') of the formula $$O=C=N-R-N=C=O$$

wherein R has the same meaning as given hereinbefore,

In a molar ratio of (iii) to (iv) or of (iii) to (iv') which ranges from about 0.9 to 1.1, whereby the ratio of the moiety X to the moiety Y in the resulting polymer corresponds to $n$, at a temperature in the range of from $-20°$ to $+80°$ C. and in the presence of an organic solvent for said reactants (iii) and (iv) or (iv'), respectively, which solvent is inert under reaction conditions, and for the final reaction product, thereby obtaining a solution of the latter in said solvent.

More in particular, bifunctional compounds (iv) of the formula $$Cl-CO-Y-CO-Cl$$

in which Y has the meaning as defined under (a), (b) or c) given hereinbefore following Formula IIIa, will afford the corresponding groups Y in the chain of the final polymer.

Bifunctional compounds (iv) of the formula

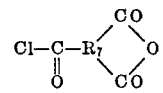

wherein $R_7$ represents a member selected from straight-chain alkyl of at most 12 carbon atoms, cycloalkyl of from 5 to 8 carbon atoms, phenyl, diphenyl, naphthyl or phenylene-E-phenyl, E having the meaning given hereinbefore or methylene-cyclohexylene-methyl, and in each of which members two hydrogen atoms at the same or preferably vicinal carbon atoms have been replaced by bonds to the group —CO—O—CO—, afford polymers according to the invention in which Y is the divalent grouping

Bifunctional compounds (iv) of the formula

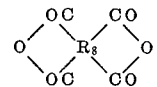

wherein $R_8$ represents the same members as $R_7$, but in each of which members, three hydrogen atoms have been replaced to provide a total of four free bonds to which the two groups— CO—O—CO— are linked, afford polymers according to the invention in which Y is the divalent radical

More in detail, the bis-hydrazide prepolymers of Formula VII are produced from at least one bis-acid halide of Formula VI and a bis-hydrazide of Formula V, preferably at a temperature of from 0 to 40° C., using for each mole of prepolymer of Formula VII $n$ moles of bis-acid halide and $n+1$ moles of the bis-hydrazide capping agent, $n$ being a number ranging from 0.5 to 5.

While in the case of higher molecular weights of the bis-acid halide of Formula VI, i.e. at molecular weights of 2500 to 5000, $n$ can be chosen from the range of from 0.5 to 1.5, in cases of the molecular weight of the bis-acid halide of Formula VI being between 800 and 2500, it is generally of advantage to choose $n$ between 1.0 and 3, and most preferably between 1.0 and 2.5.

In practice, this reaction is performed in solution and optionally in the presence of an acid acceptor preferably in corrosion resistant apparatus, made e.g. of enamel or glass. The conventional inert organic solvents used in solution polymerization are suitable as solvents. When substantially neutral solvents are used such as ethers, e.g. dioxan, tetrahydrofuran, 1,2-dimethoxyethane or chlorinated hydrocarbons, e.g. methylene chloride, chloroform, tetrachloroethylene or sulfones, e.g. tetramethylene sulfone, the use of acid acceptors such as the usual tertiary bases, e.g. triethylamine, pyridine or N-ethyl morpholine is recommended; also inorganic acid acceptors can be used such as carbonates or hydroxides of alkali metals and alkaline earth metals, e.g. calcium carbonate or sodium hydroxide. On using the preferred weakly basic solvents of the acid amide type, e.g. hexamethyl phosphoric acid triamide, dimethyl acetamide, N-methyl-pyrrolidone, tetramethyl urea, the addition of an acid acceptor is not absolutely necessary, it is sometimes even injurious with regard to the color of the polymers formed.

Advantageously, one mol of bis-hydrazide or a mixture of bis-hydrazides of Formula V is dissolved previously in one of the solvents mentioned above, preferably in dimethyl acetamide or N-methyl pyrrolidone, and, at 0–40° C., 0.5 to 0.75 mol of a bis-acid chloride of Formula VI is so added, while mixing very well and, when using larger amounts with cooling if necessary, so that the temperature does not exceed 100°, and preferably does not rise above 40° C. The rapidity of the addition is not critical apart from the instructions regarding temperature, and the time of the addition can be from a few seconds to several hours. The amount of solvent used is also not critical as long as the bis-hydrazide component remains in complete solution. For economic and practical reasons, the minimal amount by weight of solvent is about 10 to 20 times the amount by weight of bis-hydrazide. In this way polymer solutions ready for spinning are obtained which latter must be neither concentrated nor diluted.

The following bis-hydrazides alone or in the form of mixtures can be used, e.g. as starting materials of Formula V: aliphatic dihydrazides such as carbodihydrazide, oxalic acid dihydrazide, adipic acid dihydrazide, sebacic acid dihydrazide; aromatic dihydrazides such as isophthalic acid dihydrazide; heterocyclic dihydrazides such as furan-2,5-dicarboxylic acid dihydrazide, thiophene-2,5-dicarboxylic acid dihydrazide, pyridine-2,5-dicarboxylic acid dihydrazide; dihydrazides of hydroxy acids of s-triazine such as 2,4-dihydrazino-s-triazine,
2,4-dihydrazino-6-methyl-s-triazine,
2,4-dihydrazino-6-ethyl-s-triazine,
2,4-dihydrazino-6-propyl-s-triazine,
2,4-dihydrazino-6-cyclohexyl-s-triazine,
2,4-dihydrazino-6-phenyl-s-triazine,
2,4-dihydrazino-6-benzyl-s-triazine,
2,4-dihydrazino-6-amino-s-triazine,
2,4-dihyldrazino-6-methylamino-s-triazine,
2,4-dihydrazino-6-ethyl-amino-s-triazine,
2,4-dihydrazino-6-propylamino-s-triazine,
2,4-dihydrazino-6-isopropylamino-s-triazine,
2,4-dihydrazino-6-butylamino-s-triazine,
2,4-dihydrazino-6-pentylamino-s-triazine,
2,4-dihydrazino-6-octylamino-s-triazine,
2,4-dihydrazino-6-dodecylamino-s-triazine,
2,4-dihydrazino-6-stearylamino-s-triazine,
2,4-dihydrazino-6-dimethylamino-s-triazine,
2,4-dihydrazino-6-diethylamino-s-triazine,
2,4-dihydrazino-6-dipropylamino-s-triazine,
2,4-dihydrazino-6-di-isopropylamino-s-triazine,
2,4-dihydrazino-6-dibutylamino-s-triazine,
2,4-dihydrazino-6-dipentylamino-s-triazine,
2,4-dihydrazino-6-dihexylamino-s-triazine,
2,4-dihydrazino-6-dioctylamino-s-triazine,
2,4-dihydrazino-6-didodecylamino-s-triazine,
2,4-dihydrazino-6-distearylamino-s-triazine,
2,4-dihydrazino-6-diallylamino-s-triazine,
2,4-dihydrazino-6-dibenzylamino-s-triazine,
2,4-dihydrazino-6-morpholino-s-triazine,
2,4-dihydrazino-6-dicyclohexylamino-s-triazine,
2,4-dihydrazino-6-anilino-s-triazine,
2,4-dihydrazino-6-N-methyl-N-phenylamino-s-triazine,
2,4-dihydrazino-6-N-ethyl-N-phenylamino-s-triazine,
2,4-dihydrazino-6-diphenylamino-s-triazine,
2,4-dihydrazino-6-hydroxy-s-triazine,
2,4-dihydrazino-6-methoxy-s-triazine,
2,4-dihydrazino-6-ethoxy-s-triazine;

dihydrazides of hydroxy acids of o-, m- or p-diazine such as 2,4-dihydrazino-6-dimethylamino-1,3-diazine,
2,4-dihydrazino-6-dibutylamino-5-chloro-1,3-diazine,
2,4-dihydrazino-6-N-methyl-N-phenylamino-1,3-diazine,
2,4-dihydrazino-6-N-methyl-N-benzyl-1,3-diazine,
2,4-dihydrazino-6-N-methyl-N-cyclohexyl-1,3-diazine, 1,4-dihydrazino-phthalazine,
2,3-dihydrazino-quinoxaline,
2,5-dihydrazino-1,4-diazine,
3,5-dihydrazino-1,2,4-triazine as well as
2,4-dihydrazino-6-phenyl-m-diazine,
2,4-dihydrazino-6-methyl-m-diazine,
2,4-dihydrazino-6-benzyl-m-diazine,
2,4-dihydrazino-5-methyl-6-phenyl-m-diazine produced by the process described in Bull. France, 1959 pp. 1793 to 1798.

Also, dihydrazides of heterocyclic hydroxycarboxylic acids can be used, e.g. 2-hydrazino-1,3-diazine-5-carboxylic acid hydrazide, 2-dimethylamino-3-hydrazino-quinoxaline-6-carboxylic acid hydrazide, which can be obtained by the usual processes.

Instead of the mononuclear dihydrazino-s-triazines or diazines mentioned above, also suitable are, in particular, polynuclear dihydrazino - di - s - triazines of, e.g. the formulae:

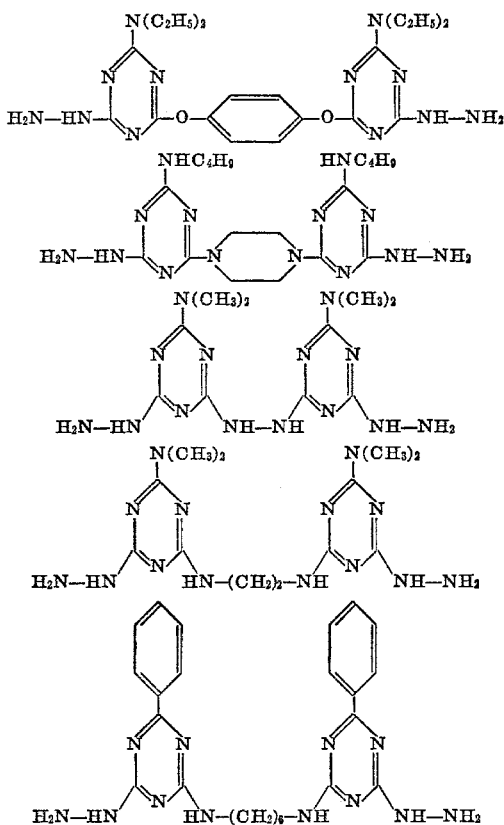

Some of the bis-hydrazides of Formula V are known and can be produced by the usual methods from corresponding, suitable acid derivatives such as esters or, particularly, chlorides. Sebacic acid is synthesised, e.g. from dimethyl sebacate and two mols of hydrazine hydrate; 2,4-dihydrazine-6-dipropylamino-s-triazine is synthesised from 2,4-dichloro-6-dipropylamino-s-triazine and two mols of hydrazine hydrate.

The following acid dihalides of Formula VI can be used for the production of the bis-hydrazides of Formula VII:

Alkane-ω,ω'-dicarboxylic acid halides according to U.S. Patent No. 3,044,989, Example 7, bis-chloroformates of alkane-ω,ω'-diols, which diols are obtained by ozonalysis of butyl rubber of molecular weight 800,000 (containing 2 mole percent of isoprene). The procedure is described in greater detail in J. Polymer Sci. Part A-1, 4, 447 (1966), W. H. Stubbs et al.

Bis-chloroformates of polyethers and/or polythioethers having two substantially terminal hydroxyl groups such as polyethylene glycol-, polypropylene glycol-, polytetramethylene glycol-, polypentamethylene glycol-, polyhexamethylene glycol-, polydecamethylene glycol-, polyethylene-propylene glycol-, poly-(1,6-dioxa-9-thia-undecane) glycol- and poly-(1-oxa-4-thia-hexane) glycol-bis-chloroformate, some of which are described in U.S. Patent No. 2,835,654 and they can be obtained by the methods there given.

Bis-chloroformates of polyesters having two substantially terminal hydroxyl groups such as polyethylene adipate-, polybutylene adipate-, polydecamethylene adipate-, polyethylene sebacate-, polyethylene-(3-methyl adipate)- poly-(2,2-dimethylpropylene)-(3-ethyl adipate)-, copoly-(2,2-dimethylpropylene) - (1 - propylpropylene)adipate-, polybutylene-(3,4-diethyl adipate)-, polyhexamethylene azelate- and poly-ε caprolactone- bis-chloroformate.

The diols having terminal hydroxyl groups as well as other alkyl substituted diols upon which the last mentioned bis-chloroformate is based, which are suitable for the production of bis-chloroformates, are obtained according to U.S. Patent No. 3,186,971.

Some of the bis-choroformates corresponding to Formula VI are known and are obtained from the corresponding diols and phosgene in the absence of bases. In their production it is less critical whether phosgene is used in excess and the diol, as such or dissolved in a suitable inert solvent such as benzene, methylene chloride or dioxane, is slowly added dropwise at $-20°$ to $+80°$ C., preferably at room temperature up to $40°$ C., or whether phosgene is introduced into the liquid or dissolved diol at the temperatures mentioned above until an excess is attained. In both cases, the excess phosgene and liberated hydrogen chloride are removed under reduced pressure; they are best removed while stirring and bubbling through a dry inert gas such as nitrogen.

Also halides of polyesters having two substantially terminal carboxy groups can be used as acid dihalides of Formula VI. The same dicarboxylic acids and glycols can be used for the production of the polyesters as are used for the synthesis of the polyesters having hydroxyl end groups mentioned above, except that the dicarboxylic acids must be used in excess. These polyester dicarboxylic acids are converted into the desired acid dihalides of Formula VI by the usual methods, e.g. with well purified thionyl chloride.

The same or similar polyester dicarboxylic acid dihalides and polyether dicarboxylic acid halides are obtained when polyester or polyether diols are reacted with an excess of dicarboxylic acid dihalides. The usual aliphatic and aromatic dicarboxylic acid halides such as sebacic acid dichloride, adipic acid dichloride, terephthalic acid dichloride and isophthalic acid dichloride can be used as such dicarboxylic acid dihalides which are suitable for the reaction with the terminal hydroxyl groups of the macrodiols mentioned.

The bis-acid hydrazides so produced of the general Formula VII are in the form of the mixture usual in condensation polymers of polymer homologous individual compounds. These compounds essentially exhibit the Flory distribution.

If the abbreviation $\overline{X}$ is used for the radical

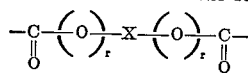

of the bis-acid halide of Formula VI and $\overline{A}$ for the radical —NH—NH—A—NH—NH— of the bis-hydrazide of Formula V, then, on reacting $n$ mol of bis-acid halide of Formula VI with $n+1$ mol of bis-hydrazide of Formula V, 1 mol of a mixture is formed which, in addition to unreacted bishydrazide H—$\overline{A}$—H ($n^*=0$) still present therein, contains the macho-bis-hydrazides falling under the general Formula VII:

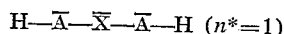

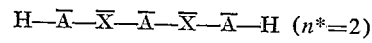

On a molar basis, the arithmetic mean of all $n^*$ equals the stoichiometric value $n$.

The elastomers according to the invention having a sequence of recurring units of Formula I are produced by condensing the bis-hydrazides described above of Formula VII with so-called chain extenders, which introduce the radical

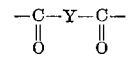

in a molar ratio from the range of 0.9 to 1.1 and preferably from the range of 0.95 to 1.05. This condensation is performed under reaction conditions as described above for the condensation of the acid dihalides of Formula VI with the bis-hydrazides of Formula V, the above-mentioned solvents, acid acceptors and concentrations being particularly suitable therefor. The temperature should be held in a range of from $-20$ to $80°$ and preferably 0 to $40°$ C. Advantageously, the two condensations are performed consecutively in the same reaction vessel. The chain extender, in solid or liquid form or also dissolved in the smallest permissible amount of solvent, is added while mixing thoroughly to the previously prepared bis-hydrazide of Formula VII which is advantageously in solution, care being taken, if necessary, by cooling, that the temperature ranges given above are not exceeded. In the production of very highly concentrated and, therefore, highly viscous solutions, the polycondensation is advantageously performed in a kneader.

The use of acid amides as solvents is of particular advantage as, in this case, elastic polymers having high molecular weights and minimal inherent color are also obtained without acid acceptors. This is of technical importance as solutions of the elastic polymers produced in this way can be spun direct whilst the use of acid acceptors necessitates an additional filtration before spinning.

The usual additives for elastomeric articles in sheet or fibre forms such as fillers, delustering agents, stabilizers, pigments or dyestuffs, can be admixed at any stage in the production of the elastomers; advantageously the additives are added before the condensation which produces "chain extension."

Chiefly acid dihalides, but also isocyanates, and tetracarboxylic acid dianhydrides, also however, those substances having two different functions such as monoacid chlorides of anhydrides of tricarboxylic acids, are used as chain extenders.

Of the acid dihalides, especially dicarboxylic acid dihalides and bis-chloroformates are mentioned as chain extenders. Of these dicarboxylic acid halides, aliphatic dicarboxylic acid halides, such as malonyl chloride, adipyl chloride, pimelic acid dibromide, sebacyl chloride are suitable, with certain precautions also alicyclic dicarboxylic acid halides such as 1,3- and 1,4-cyclohexane dicarboxylic acid dichloride, in particular the mixtures, as technically produced, of cis- and trans-isomers, and aromatic dicarboxylic acid chlorides such as diphenyl ether-4,4'-dicarboxylic acid dichloride, diphenyl thioether-4,4'-dicarboxylic acid dichloride, diphenyl sulfone-3,3'- or -4,4'-dicarboxylic acid dichloride, diphenylmethane-4,4'-dicarboxylic acid dichloride, 2,2-bis-(4-chlorocarbonylphenyl)-propane, 2,2-bis-(4-chlorocarbonylphenyl)-butane, 1,1-bis-(4-chlorocarbonylphenyl)-butane, are suitable. Particularly suitable, however, are terephthaloyl dichloride, isophthaloyl dichloride, 4,4'-diphenyl dicarboxylic acid dichloride, and naphthalene-2,6-dicarboxylic acid dichloride.

Bis-chloroformates suitable as chain extenders are the bis-chloroformates of aliphatic diols such as 1,2-dihydroxyethane-, 1,2 - dihydroxypropane-, 1,3 - dihydroxypane, 1,4-dihydroxybutane-, 1,3-dihydroxy-2,2-dimethylpropane, 1,6-dihydroxyhexane- bis-chloroformate as well as those of cycloaliphatic diols, such as 1,4-bis-hydroxymethyl-cyclohexane-bis-chloroformate. Also the related N,N'-bis-chlorocarbonyl piperazine is suitable as chain extender.

Of the isocyanates which can be used as chain extenders, while bearing in mind the disadvantages given above, can be mentioned the aliphatic di-isocyanates, particularly those which are derived from amines having 4 or more carbon atoms in the chain such as butane-1,4-di-isocyanate, hexane-1,6 - di-isocyanate, dodecane-1,12-diisocyanate, 2,2,4-trimethylhexane-1,6-di-isocyanate, the cycloaliphatic di-isocyanates such as 1,4-bis-(isocyanatomethyl)-cyclohexane as well as the monocyclic, araliphatic di-isocyanates such as 1,3- and 1,4-bis-(isocyanatomethyl)-benzene, 1,3-bis-(isocyanatomethyl)-2,4-dimethylbenzene and 1,4-bis-(isocyanatomethyl)-2,5-dichlorobenzene.

Also, bis-anhydrides of tetracarboxylic acids, such as pyro-mellitic acid anhydride, cyclopentane-1,2,3,4-tetracarboxylic acid anhydride, cyclohexane-1,2,3,4-tetracarboxylic acid anhydride, butane-1,2,3,4-tetracarboxylic acid anhydride as well as monoacid halides of tri-carboxylic acid anhydrides such as the substances of the formulae

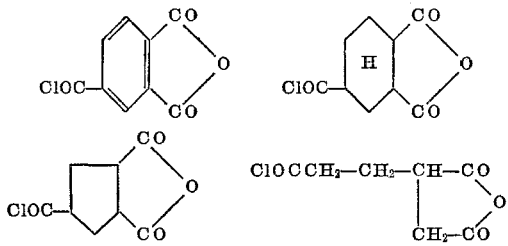

are suitable as chain extenders. The three compounds last mentioned are obtained from the oxidation products of Diels-Alder products of addition of acrylic acid to cyclohexadiene, cyclopentadiene or butadiene, respectively.

According to the processes described above, the new elastic polymers according to the invention are obtained in solution. These polymers can be isolated by the usual methods such as evaporation of the solvent or by addition of a precipitating agent such as water or mixtures of water and low alcohols when water miscible solvents have been used, or by the addition of pure hydrocarbons such as hexane, heptane or mixtures of hydrocarbons such as petroleum ether or ligroin when weakly polar, non-water miscible solvents have been used.

The elastomers are advantageously isolated in corrosion-resistant apparatus, which is lined, e.g., with enamel or glass, at the same time as they are shaped, for instance, to produce films and threads by the known "wet" and "dry" spinning processes. If acid acceptors have been used in the polycondensation the hydrohalic acid salts of which are completely or partially insoluble in the solvent employed, the elastomer must first be precipitated with water and separated from the liquid phase, e.g. by filtration, to remove water-soluble salts, or the solution must be filtered before shaping. It is even possible to perform the polycondensation simultaneously with the shaping, e.g. by interfacial polycondensation.

Naturally, the elastomers isolated from the reaction solution can again be dissolved in solvents which particularly facilitate shaping. Solvents which can be used for the production of solutions of suitable concentration for dry spinning are N,N-dimethyl formamide, N,N-dimethyl acetamide, tetramethylene sulfone, formic acid and mixtures of 1,1,2-trichloroethane and formic acid in a ratio of 60:40, with which spinning speeds of up to 900 meters per minute are attained. For the reasons mentioned above, however, the neutral or slightly basic solvents such as dimethyl acetamide are preferred.

More advantageously, elastomeric articles which have been obtained directly from the reaction solution after the dry spinning process are treated with water to remove traces of solvent, acid acceptors or salts thereof and any traces of hydrohalic acids. This water treatment is performed between 0 and 100°, preferably between 60 to 90° C. Sometimes it is recommended to begin the treatment at room temperature and to successively increase the water temperature to the boiling point, the treatment water being kept neutral. If the radical X in Formula II contains numerous ester bonds, the temperature of the treatment water must be kept low and its neutral reaction must be particularly carefully controlled due to danger of hydrolysis. On the other hand, when X represents polyether radicals, the susceptibility to oxidation of polyethers must be taken into account, e.g. the possibility of a reaction with oxygen or other oxidising agents should be kept to a minimum.

In general it is advantageous to produce low denier fibers by the dry spinning process. The wet spinning process, however, is used for high denier fibers. Preferred solvents for both cases are N,N-dimethyl formamide and N,N-dimethyl acetamide.

Wet spun filaments of elastomers are also advantageously after-treated with warm water.

Like all soft (rubbery) polymers, the new elastomers have a greater tendency to stick together than the crystalline hard (non-rubbery) polymers such as nylon 66, etc. When care is taken this does not lead to particular difficulties; optionally, pre-treatment of the threads with steam or application of talcum thereto immediately before winding on bobbins or the like is recommended, particularly when winding is performed under tension.

In general, the properties of the elastomers according to the invention are sufficient for practical purposes but they can be improved or modified by drawing the films or filaments, and, optionally, by subsequent setting. Drawing is performed at above the glass transition temperature of the polymers, advantageously at between room temperature and 150° C. The most favourable effects on tenacity, initial modulus, stretchability, stress decay etc. are generally obtained if drawing by a factor of 2 to 10, preferably 4 to 6, is performed at room temperature and then the filaments or films are set under tension at 100–150° C. for at least one, preferably several, hours. Since, with otherwise the same properties, articles made of elastic polymers are the more suitable for commercial purposes the greater their tenacity and elongation at break, the above treatment is advantageous, particularly in critical cases.

Compared with previously known elastic polymers, the elastomers according to the invention have improved stability to light and oxidation which can be seen, particularly, in a substantially improved resistance to yellowing. Also the fastness to gas fading is considerably increased over that of previously known polymers having otherwise similar properties. Compared with previously known elastic polymers the light fastness of which approaches that of the elastomers according to the invention, the latter have improved thermal stability combined with better solubility which make it possible to produce articles having improved initial properties, in particular improved initial colour. Compared with previously known elastomers, the elastic polymers according to the invention, when having comparable mechanical properties, have improved dyeability as well as somewhat increased water absorption and, when they can be dyed equally well as the known polymers, they have improved mechanical properties, especially in the wet condition. For extreme requirements, the stability of the elastomers according to the invention can be further improved by the addition of anti-oxidants particularly from the class of non-colouring, sterically hindered phenols and by the addition of gas fading inhibitors such as are used, e.g. for the stabilisation of gas fading-sensitive dyestuffs in acetyl cellulose, as well as by the addition of UV absorbers, particularly from the class of benzophenone, benzotriazole and cinnamic acid nitrile and ester. To attain articles having particularly high grade whiteness, the addition of optical brighteners is recommended, for fibers, in addition, a delustering agent such as titanium dioxide.

The molecular weight of the new elastic polymers is advantageously chosen as high as possible; an upper limit is determined only by the solubility. There is always uncertainty attached to the determination of the absolute molecular weight. It is, therefor, more advantageous to work with characteristic figures derived direct from the test results, such as the inherent viscosity.

In general, the new elastic polymers must have an inherent viscosity of at least 0.5. Products having low inherent viscosities—0.5 to about 1—are suitable, because of the favourabe flowing properties of their solutions, for the production of elastic coatings in particular. In the form of their solutions, they can be sprayed, painted or poured onto the substrate to be coated and, after evaporation of the solvent, they yield coherent, highly elastic, colourless and non-yellowing coatings. Substrates are for example metals, wood, leather, paper fabrics, films, polymeric materials and the like. The elastic polymer coating can also be attained by the dip tank process by dipping the objects to be coated in a polymer solution and, after dripping off excess solution, drying. The solubility of the elastic polymers is a very important criterion for all these applications. What is chiefly required is solubility in relatively low boiling, physiologically acceptable and non-corrosive solvents such as the usual ketone, ester and ether solvents.

For the production of unsupported elastic articles such as foils and threads, the use of elastic polymers according to the invention having higher, i.e. over 1, inherent viscosity is advantageous. Preferably elastic polymers are used for these applications the inherent viscosity of which is from 1.5 to 4. Polymers having such high inherent viscosities yield films and threads having particularly low stress decay and favourable softening temperatures. Other properties being equal, the lower the stress decay and the hgher the softening temperature, the more suitable are filaments in practical use.

Of the bis-hydrazides of general Formula VI, 2,4-dihydrazino-s-triazines are preferred as starting products for the new elastic polymers because of the favourable solubility properties of the resultant polymers and/or of the bis-hydrazides themselves and because of the fact that they do not require acid acceptors when the polycondensation is performed in the preferred solvents of the acid amide type and they produce polymers which can be dyed well and which have good stability to yellowing.

For purposes in which the elastic polymers often come into contact with aggressive media such as hot water, acid or basic liquids, polymers are preferred which are derived from polyether bis-chloroformates. Of these, the bis-chloroformates of homopolyethers of tri-, tetra-, penta- and hexamethylene glycol, propylene glycol and neopentyl glycol or of copolyethers of these glycols among themselves or with ethylene glycol, whereby the latter, on a molar basis, may amount to at most 50% of the polyether. On the other hand, for purposes in which the elastic polymers are chiefly exposed to air at high temperatures, particularly sunlight, polymers are preferred which are derived from polyester bis-chloroformates. Of these, the bis-chloroformates of: homo- or mixed polymers of ω-hydroxycarboxylic acids having at most 12 carbon atoms and at least 6 carbon atoms in the chain including the carboxyl group, such as poly-ε-caprolactone, and of polyesters from at least one aliphatic dicarboxylic acid having a total of 6 to 12 carbon atoms, in which the two carboxyl groups must be separated by at least 4 saturated carbon atoms, such as adipic acid, 2,2,4-trimethyl adipic acid or sebacic acid, and polyesters from at least one glycol having a total of 2 to 12 carbon atoms, wherein the two hydroxyl groups must be separated by at least 2 saturated carbon atoms, such as ethylene glycol, propylene glycol, neopentyl glycol, 1,4-butane diol and 1,12-dodecane diol, are preferred.

Because of their particularly favourable mechanical properties, those elastic polymers are specifically preferred which are produced from polytrimethylene glycol or tetramethylene glycol bis-chloroformate capped with 2,4-dihydrazino-6-bis-low alkylamino-s-triazines, the molecular weight of which is 1000–3000, and from terephthalic acid dichloride. Of these polymers, optimal properties are possessed by those in which the low alkyl group of the s-triazine compound used has, on the average, a straight chain of 2 to 4 carbon atoms and the polytri- or polytetramethylene glycol bis-chloroformate has a molecular weight of 1500 to 2500, and in the production of which the s-triazine compound and bis-chloroformate have been used in molecular ratio of 2:1 to 4:3, preferably 2:1 to 7:5, i.e. polymers according to the invention in which $n$ is 1 to 3, preferably 1 to 2.5.

The following examples illustrate the invention without limiting it. The temperatures are given in degrees centigrade. Also, where not otherwise stated, parts are given as parts by weight and their relationship to parts by volume is as that of kilograms to litres. The physical properties usual to characterise elastic polymers are used according to the following definitions.

Inherent viscosity $$(\eta_{inh.}) = \frac{\ln \eta_{rel}}{c}$$

in which $c$ is the concentration of the polymer in g./100 ml. solvent and $\eta_{rel}$ is the quotient of the viscosity of the solution of the polymer at the concentration $c$ and of the pure solvent. The inherent viscosities are measured at 25° C. in a concentration of 0.5 g. polymer/100 ml. of m-cresol.

The tenacity (g./den., or kg./sq. mm.) is measured on a cross section of the threads or films in unstretched condition.

The elongation at break corresponds to the percent elongation of the sample at the breaking point expressed in percent of the initial length.

The stress decay is the percent loss in stress in a sample one minute after it has been elongated to 50% at the rate of 100% per minute.

The tensile recovery is the percentage return to the original length within one minute after the tension has been released from the sample which has been elongated 50% at the rate of 100% per minute, and held at 50% elongation for one minute. The calculation is made according to the formula:

$$\frac{L_0}{L_1} \cdot 100 = \text{percent tensile recovery}$$

in which $L_0$ is the initial length and $L_1$ return length after elongation.

Example 1

5.3 parts of the polytetramethylene glycol bis-chloroformate more closely defined below are added to a solution of 1.8 parts of 2,4-dihydrazino-6-dipropylamino-s-triazine in 40 parts by volume of hexamethyl phosphoric acid triamide in a narrow necked flask as usually used for liquids, and the whole is immediately well mixed. The reaction mixture becomes slightly warm and, after standing for half an hour at room temperature, it is cooled to about 5–10° and 0.46 part of adipic acid dichloride is added. The resultant mixture is immediately well shaken whereupon it becomes slightly warm and its viscosity greatly increases within one minute. After standing for 15 minutes, the polymer so produced is precipitated by pouring the reaction solution into water. It is washed several times with water and dried overnight in a vacuum drying oven at 70° under a pressure of 15 mm. Hg. The white, elastic polymer, which has an inherent viscosity of 1.38, easily dissolves in dimethyl acetamide and is cast into films from a solution which contains 25 g. of polymer in 75 ml. of dimethyl acetamide. After evaporating the solvent in a vacuum drying oven at 70° for 16 hours, colourless, clear films are obtained which have a stress decay of 19% and a tensile recovery of 95%.

The bis-chloroformate used is obtained as follows: 8 parts of phosgene are condensed in a gas trap free of moisture. 10 parts of polytetramethylene glycol of an average molecular weight of 960 and OH number 117 are added to the liquid phosgene within 4 hours while stirring well and cooling to 0 to 4°. The reaction solution is then stirred for 2 hours at 0–5° whereupon the main amount of the excess phosgene and the hydrogen chloride formed are removed by bubbling dry nitrogen through the reaction solution for several hours at room temperature. The polytetramethylene glycol bis-chloroformate is liberated from the last traces of phosgene and hydrogen chloride by passing a weak stream of nitrogen through the reaction vessel at 40° under vacuum. It is then in the form of a substantially colourless, viscous liquid having a chlorine content of 6.58%.

Similar elastic polymers are obtained if, instead of the 0.46 part of adipic acid dichloride, equimolar amounts of dicarboxylic acid dihalides given in Table 1 are used with otherwise the same procedure. The inherent viscosity, elongation at break and tensile recovery of films made from these polymers are given in this table.

TABLE 1

|  | Elongation at break | Tensile recovery | Inherent viscosity ($\eta_{inh.}$) |
| --- | --- | --- | --- |
| 1a. Adipic acid dichloride | 700–800 | 95 | 1.38 |
| 1b. Adipic acid dibromide | 700–800 | 96 | 1.12 |
| 1c. Succinic acid dichloride | 600–750 | 97 | 1.24 |
| 1d. Sebacic acid dichloride | 800–1,000 | 94 | 1.08 |
| 1e. Sebacic acid dibromide | 850–1,000 | 94 | 1.0 |
| 1f. Trans cyclohexane-1,4-dicarboxylic acid dichloride | 600–700 | 98 | 1.19 |

Example 2

A solution of 1.38 parts of 2,4-dihydrazino-6-dimethylamino-s-triazine in 40 parts by volume of dimethyl acetamide are placed in a narrow necked flask as usually used for liquids from which adherent water has been removed by flaming and which has been cooled under an atmosphere of nitrogen. 10.28 parts of polytetramethylene glycol bis-chloroformate having a chlorine content of 3.45% are added and the mixture obtained is strongly shaken whereupon it becomes more viscous and noticeably hotter. After cooling to 5–10°, 0.508 part of solid terephthalic acid dichloride is added and the whole is strongly shaken whereupon the acid chloride dissolves. After about 15 minutes, the polymer formed is precipitated by pouring the highly viscous reaction solution into water while vigorously agitating. It is then washed several times with water and dried overnight at 70° in a vacuum drying oven. It then has an inherent viscosity of 1.58 and, when worked up as described in Example 1, yields films which have a stress decay of 18% and a tensile recovery of 94.

The bis-chloroformate is obtained as described in Example 1 by reaction of polytetramethylene glycol having a molecular weight of 1930 with excess phosgene.

Similar elastic polymers are obtained if, instead of the 1.38 parts of 2,4-dihydrazino-6-dimethylamino-s-triazine, equimolar amounts of s-triazines given in Table 2 are used and otherwise the same procedure is followed.

TABLE 2

|  | Elongation at break, percent | Tensile recovery, percent | $\eta_{inh.}$ |
| --- | --- | --- | --- |
| 2a. 2,4-dihydrazino-6-dimethylamino-s-triazine | 800–1,000 | 94 | 1.58 |
| 2b. 2,4-dihydrazino-6-dibutylamino-s-triazine | 900–1,000 | 98 | 2.54 |
| 2c. 2,4-dihydrazino-6-dioctylamino-s-triazine | 1,000–1,200 | 96 | 2.04 |
| 2d. 2,4-dihydrazino-6-dicyclohexylamino-s-triazine | 700–900 | 94 | 1.95 |
| 2e. 2,4-dihydrazino-6N-methyl-N-benzylamino-s-triazine | 800–900 | 94 | 1.80 |
| 2f. 2,4-dihydrazino-6-N-methyl-N-butylamino-s-triazine | 800–1,000 | 95 | 2.13 |
| 2g. 2,4-dihydrazino-6-hexylamino-s-triazine | 800–1,000 | 96 | 2.05 |
| 2h. 2,4-dihydrazino-6-N-methyl-N-phenylamino-s-triazine | 800–950 | 94 | 2.24 |
| 2i. 2,4-dihydrazino-6-[5H-dibenzo(e,f)-azepinyl-(5)]-s-triazine | 600–700 | 93 | 1.68 |
| 2k. 2,4-dihydrazino-6-phenyl-s-triazine | 800–1,000 | 94 | 2.31 |
| 2l. 2,4-dihydrazino-6-methyl-s-triazine | 800–900 | 96 | 2.12 |
| 2m. 2,4-dihydrazino-6-diethylamino-s-triazine | 800–1,000 | 98 | 2.45 |
| 2n. 2,4-dihydrazino-6-di-n-hexylamino-s-triazine | 800–1,000 | 94 | 2.35 |
| 2o. 2,4-dihydrazino-6-dioctadecylamino-s-triazine | 900–1,100 | 85 | 2.15 |
| 2p. 2,4-dihydrazino-6-diallylamino-s-triazine | 850–950 | 92 | 1.85 |
| 2q. 2,4-dihydrazino-6-dodecenylamino-s-triazine | 900–1,000 | 91 | 1.8 |
| 2r. 2,4-dihydrazino-6-morpholino-s-triazine | 700–800 | 92 | 1.7 |
| 2s. 2,4-dihydrazino-6-pyrrolidino-s-triazine | 750–850 | 93 | 1.45 |
| 2t. 2,4-dihydrazino-6-piperidino-s-triazine | 800–900 | 93 | 1.64 |
| 2u. 2,4-dihydrazino-6-hexamethylene-imino-s-triazine | 800–900 | 91 | 1.82 |
| 2v. 2,4-dihydrazino-6-thiomorpholino-s-triazine | 700–800 | 90 | 1.37 |
| 2w. 2,4-dihydrazino-s-triazine | 600–700 | 91 | 1.84 |
| 2x. 2,4-dihydrazino-6-benzyl-s-triazine | 700–800 | 91 | 1.42 |
| 2y. 2,4-dihydrazino-6-n-propoxy-s-triazine | 800–900 | 96 | 2.1 |
| 2z. 2,4-dihydrazino-6-methoxy-s-triazine | 750–850 | 92 | 2.07 |
| 2a'. 2,4-dihydrazino-6-n-propyl-s-triazine | 800–1,000 | 98 | 2.56 |
| 2b'. 2,4-dihydrazino-6-(4-fluorophenyl)-s-triazine | 800–900 | 91 | 1.4 |
| 2c'. 2,4-dihydrazino-6-(4-methoxyphenyl)-s-triazine | 800–900 | 90 | 1.45 |
| 2d'. 2,4-dihydrazino-6-(3-toluyl)-s-triazine | 700–800 | 91 | 1.35 |
| 2e'. 2,4-dihydrazino-6-(2',4'-di-chlorophenyl)-s-triazine | 800–900 | 92 | 1.52 |
| 2f'. 2,4-dihydrazino-6-(4-bromophenyl)-s-triazine | 800–900 | 91 | 1.36 |
| 2g'. 2,4-dihydrazino-6-(cyclohexyl)-s-triazine | 800–1,000 | 94 | 1.75 |
| 2h'. 2,4-dihydrazino-6-hydroxy-s-triazine | 700–800 | 94 | 1.6 |

Films made from polymers No. 2a, 2b, 2c, 2d, 2e, 2f, 2g, 2k and 2m do not become discoloured after 40 hours' exposure in a Xenotest exposure apparatus, while films made from polymers 2h, 2i and 2l turn slightly yellow.

Example 3

A solution of 2,4 parts of 2,4-dihydrazino-6-dipropylamino-s-triazine and 1.2 parts of 2,4-dihydrazino-6-di-isopropylamino-s-triazine in 60 parts by volume of dimethyl acetamide is placed in a three-necked flask fitted with stirrer, thermometer and dropping funnel. At 5°, while stirring well, a solution of 5.3 parts of polytetramethylene glycol bis-chloroformate (chlorine content 6.58%), produced according to Example 1, and 10.28 parts of polytetramethylene glycol bis-chloroformate (chlorine content 3.45%), produced according to Example 2, is poured in and the funnel is rinsed with a little dimethyl acetamide. The temperature of the solution obtained rises to 12° and the viscosity increases. After 15 minutes, 1.015 parts of terephthalic acid dichloride are added all at once while cooling with ice. A clear, highly viscous solution is obtained which, without previous precipitation, is cast with a doctor knife into films. They are dried overnight at 70° in a vacuum drying oven under 15 mm. Hg pressure. After standing in 50° warm water overnight and renewed drying, the films obtained have a stress decay of 15% and a tensile recovery of 97%. A sample of film which has been re-dissolved has an inherent viscosity of 1.73.

By repeating Example 3, but using instead of the 1.015 parts of terephthalic acid dichloride, an equimolar amount of another chain extender as listed in Table 3 below, and otherwise following the same procedure, then the elastic polymers having the properties given in the third and fourth columns of Table 3 are obtained.

Pat. 3,186,971. The resultant polyester having two terminal hydroxyl groups, which has a molecular weight of 830, is converted into the corresponding bis-chloroformate as described in Example 1. The bis-chloroformate has a chlorine content of 7.48% and an average molecular weight of about 950.

An elastic polymer of similar properties is obtained by repeating Example 7 but replacing 4.75 parts of the bis-chloroformate by equivalent amounts of the following reactants:

(a) 5.03 parts of polytrimethylene glycol bis-chloroformate having a chlorine content of 6.71% and an average molecular weight of about 1060;

(b) 6.65 parts of polyhexamethylene glycol bis-chloroformate having a chlorine content of 5.34% and an average molecular weight of about 1330;

(c) 7.75 parts of polyneopentylene glycol bis-chloroformate having a chlorine content of 4.58% and an average molecular weight of about 1550.

Example 8

In a divided trough kneader (Pfleiderer kneader-mixer) fitted with a cooling jacket and having a total capacity of 2800 parts by volume, 16 parts of a 50% titanium dioxide paste (Rutile type) in dimethyl acetamide are thoroughly dispersed in a solution of 57.6 parts of 2,4-dihydrazino-6-dipropylamino-s-triazine, 0.6 part of 2-[2-diethylaminosulphonylstilbyl-(4)]naphtho-(1.2-d)-1,2,3-triazole, 2.6 parts of 1,3 - di - tert. butyl - 2 - hydroxy-5-(2-octadecyloxycarbonylethyl)-benzene and 2.6 parts of 2-(2-hydroxy-3,5-di-tert. butylphenyl)-5-chlorobenzotriazole in 500 parts by volume of dimethyl acetamide. While operating the kneader and cooling with water, 352 parts of polytetramethylene glycol bis-chloroformate (chlorine content 3.28%) are added within 10 minutes and the vessel from which it has been added is rinsed out twice with 125 parts by volume of dimethyl acetamide each time. During the addition, the temperature of the reaction mixture rises to 25° C. and it clearly becomes more viscous. On completion of the addition, the cooling is removed and the reaction mixture is vigorously mixed, then cooled to about 15° C. and then, while operating the kneader, 16.3 parts of solid terephthalic acid dichloride are added within 3 minutes. The temperature of the reaction mixture rises slightly to about 25° C. and, simultaneously, the viscosity thereof is very greatly increased. For better homogenisation, it is vigorously kneaded for another 15 minutes without cooling. The highly viscous elastomer solution obtained can be shaped directly in the usual way by means of the dry or wet spinning process into filaments which have good elastic properties. A sample of the reaction mixture precipitated by pouring into water after dilution with dimethyl acetamide has an inherent viscosity, in m-cresol, of 2.56. The polytetramethylene glycol bis-chloroformate required, having a chlorine content of 3.28%, is produced as described in Example 1 from polytetramethylene glycol having a molecular weight of 2080.

Example 9

A mixture of 682 parts of adipic acid, 259 parts of butanediol and 181 parts of ethylene glycol is dissolved in 460 parts of benzene and refluxed under nitrogen in the presence of 1.12 parts of $Sb_2O_3$ in an esterification apparatus, equipped with a water trap, until 120 parts of water are collected. While continuing the reaction, the solvent is removed until the refluxing temperature reaches 120°. After removal of 200 parts of water, the solvent is removed in vacuo and, after filtration, the resulting copolyester glycol is dried at 100° under nitrogen in vacuo. There is obtained a colorless slightly viscous copoly-(ethylene-butylene adipate) melting at 34–38° having by analysis an OH number of 53.5 and an acid number of 0.8, indicating a molecular weight of 2080.

A 1:1 mixture of the above copolyester glycol with dioxan is treated with phosgene as described above at 5–10°, yielding after careful removal of the solvent a bis-chloroformate having a chlorine content of 3:22%.

1.8 parts of 2,4-dihydrazino-6-dipropylamino-s-triazine in 40 parts by volume of N,N'-dimethylacetamide are condensed as described in Example 2 with 11 parts of the afore-mentioned copolyester glycol-bis-chloroformate having a chlorine content of 3.22% and then chain-extended with 0.508 part of terephthalic acid dichloride.

The elastic polymer obtained has an inherent viscosity of 0.77 and yields elastic coatings from solutions of dimethylformamide, dimethylacetamide, dimethylsulphoxide, butylacetate or N-methylpyrrolidone.

Example 10

(a) 1.8 parts of 2,4-dihydrazino-6-dipropylamino-s-triazine in 40 parts by volume of dimethylacetamide are condensed as described in Example 2 with 10.8 parts of the copolyether glycol-bis-chloroformate from 1,2-propanediol and ethylene glycol more closely defined below and then chain-extended with 0.508 part of terephthalic acid dichloride. The product is worked up as described in Example 4. The elastomer so obtained, which has an inherent viscosity of 0.92, is cast into films from dimethylacetamide solution as previously described. The films have a stress decay of 22% and a tensile recovery of 90.

The copolyether glycol from 1,2-propanediol and ethylene glycol (molar ratio 9:1), used as starting material in Example 10(a) supra, is prepared analogously to the method described in Swiss Pat. No. 404,959, p. 2 (75–93) for the preparation of copoly(thio)ethers of defined molecular weight. Its OH number is 55, corresponding to a molecular weight of 2040. The bis-chloroformate therefrom is prepared as described in Example 1. The chlorine content of the latter derivative is 3.25%.

Similar copolyether-glycols are prepared from (b) Neopentylglycol/ethyleneglycol (10:1); OH number=55.4 (M.W. 2025); and (c) Butanediol/ethylene glycol (10:1); OH number=52.8 (M.W. 2130).

The corresponding bis-chloroformates are prepared as described in Example 1. Their chlorine content is 3.28% for (b) and 3.16% for (c).

By replacing in Example 10(a) the 10.8 parts of the 1,2-propanediol/ethylene glycol - copolyether-bis-chloroformate mentioned above by equimolar amounts of the copolyether glycol-bis-chloroformates (b) and (c), respectively, and following otherwise the same procedure, similar elastic polymers are obtained, the properties of which are given in the table below.

Similar polymers are obtained when using the copolyetherester glycols, polyester glycols or copolyester glycols described below in the form of their bis-chloroformates, in lieu of the bis-chloroformate employed in Example 10(a), supra.

(d) (Copoly-butylene-neopentylene sebacate). — 648 parts of sebacic acid, 324 parts of butanediol and 42 parts of neopentylglycol, 0.5 part of $Sb_2O_3$ and 500 parts by volume of benzene are placed in an esterification apparatus equipped with water trap as described by E. Müller (Houben-Weyl, vol. 14/2, p. 18/19, 4th ed.) and refluxed, whereby the temperature of the reaction mixture rises with increasing separation of water from 87° to 116°. After 40 hours, 230 ml. of benzene are removed, which increases the reaction temperature to 200°. After 56 hours, the turbid solution is filtered, the solvent removed and the resulting copoly-butylene-neopentylene sebacate is dried under nitrogen at 120° in vacuo. Based on the OH number (98) and acid number (0.7), the molecular weight is calculated to be 1140.

The copolybutylene-neopentylene sebacate-bis-chloroformate is prepared as described in Example 1. Its chlorine content is 6.37%.

TABLE 3

| Chain extender | Tensile recovery, percent | $\eta_{inh}$ |
|---|---|---|
| (a) Isophthalic acid dichloride | 97 | 1.85 |
| (b) Naphthalene-2,6-dicarboxylic acid chloride | 94 | 1.68 |
| (c) Diphenylsulphone-4,4'-dicarboxylic acid dichloride | 91 | 1.54 |
| (d) Diphenylether-4,4'-dicarboxylic acid dichloride | 94 | 1.52 |
| (e) Diphenylsulfide-4,4'-dicarboxylic acid dichloride | 90 | 1.33 |
| (f) Diphenyl-4,4'-dicarboxylic acid dichloride | 98 | 2.15 |
| (g) Diphenylmethan-4,4'-dicarboxylic acid chloride | 94 | 2.05 |
| (h) α,α-Diphenyl-cyclohexane-4'-carboxylic acid hydrobromide | 92 | 1.45 |

Example 4

7.2 parts of 2,4-dihydrazino-6-dipropylamino-s-triazine in a three-necked flask fitted with a stirrer, thermometer and dropping funnel, are dissolved in 80 parts by volume of dimethyl acetamide. 41.12 parts of melted polytetramethylene glycol bis-chloroformate (chlorine content 3.45%), produced according to Example 2, are added to this solution while stirring well and the funnel is rinsed with 5 parts by volume of dimethyl acetamide. After half an hour, the reaction solution is cooled by means of an ice bath to 5–10° and, while stirring vigorously, 2.03 parts of terephthalic acid dichloride are added. (This means that $n$ in the formula of the resulting polymer is 2.) This rapidly dissolves. Within 10–20 seconds, the resultant solution becomes highly viscous and after about 15 minutes it is poured into a household mixer (Waring Blendor type) containing a great excess of water whereupon the colourless polymer formed precipitates in a finely distributed form. The precipitated product is slurried several times with water and then dried overnight at 70° in vacuo. The elastomer so obtained is cast into films from dimethyl acetamide solution as described in the previous examples. The films have a stress decay of 8% and a tensile recovery of 98%. A sample of these films dissolved in m-cresol has an inherent viscosity of 2.45.

25 parts of the polymer described are dissolved in 75 parts of dimethyl acetamide and the solution is spun in a usual dry spinning apparatus into monofilaments of 25 denier. These filaments have a tenacity of 0.7–0.8 g./den., an elongation at break of 700–850%, a stress decay of 8 to 10% and a tensile recovery of 97–98%. By drawing these films 4× at room temperature, the tensile recovery of the drawn filaments is increased to 98–99% and the tenacity is increased to 0.8–0.9 g./den.

By repeating Example 4, but using in lieu of the polytetramethylene glycol bis-chloroformate produced from a polyglycol-ether of molecular weight 1930, an equivalent amount of polytetramethylene glycol bis-chloroformate produced as described in Example 2, but from a polyglycol ether of molecular weight 2450, there is obtained a polymer of similar properties.

If, instead of the 7.2 parts of s-triazine compound and 41.12 parts of bis-chloroformate mentioned above, the amounts given in Table 4 are used in Example 4 with otherwise the same procedure, then similar elastic polymers are obtained, the properties of which are given in Table 4.

TABLE 4

| | 2,4-dihydrazino-6-dipropylamino-s-triazine parts | Polytetramethylene glycol bis-chloroformate parts | $n$ | Tensile recovery, percent | Stress decay, percent | $\eta_{inh}$ |
|---|---|---|---|---|---|---|
| 4a | 4.32 | 16.45 | 0.8 | 95 | 18–20 | 1.78 |
| 4b | 4.8 | 20.6 | 1 | 96 | 13–15 | 2.11 |
| 4c | 5.6 | 27.4 | 1.33 | 96 | 12–14 | 2.19 |
| 4d | 9.6 | 61.7 | 3 | 94 | 16–18 | 1.98 |

Example 5

2.44 parts of 2,4-dihydrazino-6-dihexylamino-s-triazine in 30 parts by volume of dimethyl acetamide are reacted as described in Example 3 with 5.50 parts of polypropylene glycol bis-chloroformate having a chlorine content of 6.43%. 0.42 part of hexamethylene di-isocyanate dissolved in 10 parts by volume of dimethyl acetamide are added to the solution obtained; no immediate increase in viscosity is noticeable. On the other hand, after standing for 16 hours at room temperature the viscosity of the reaction solution has visibly increased. The product is isolated and worked up as described above; it then has an inherent viscosity of 1.195. Cast from dimethyl sulphoxide, it yields films having a stress decay of 20% and a tensile recovery of 96%.

The polypropylene glycol bis-chloroformate is obtained by reacting polypropylene glycol having an average molecular weight of 975 with excess phosgene at 0–5°, stirring for 4 hours at this temperature and then removing the non-reacted phosgene by the method described in Example 1.

If, instead of the 0.42 part of hexamethylene diisocyanate, equimolar amounts of other chain extenders are used with otherwise the same procedure, then similar polymers are obtained the properties of which are given in Table 5.

TABLE 5

| Chain extender | Elongation at break, percent | $\eta_{inh}$ | Tensile recovery, percent |
|---|---|---|---|
| 5b. α,α'-m-Xylylene diisocyanate | 850–1,000 | 1.30 | 96 |
| 5c. 1,4-bis(isocyanate-methyl)cyclohexane (about 1:3 mixture cis-trans) | 850–1,000 | 1.22 | 94 |
| 5d. Piperazine dicarbonyl chloride | 750–950 | 0.98 | 96 |
| 5e. Pyromellitic acid anhydride | 400–550 | 0.95 | 96 |
| 5f. Ethylene glycol bis-chloroformate | 850–1,000 | 1.15 | 90–93 |

Example 6

8.7 parts of adipic acid dihydrazide in 400 parts by volume of hexamethyl phosphoric acid amide are condensed at room temperature as described in Example 2 with 51.2 parts of the polytetramethylene glycol bis-chloroformate having a chlorine content of 3.54% produced according to Example 2. After half an hour, the reaction solution is cooled in an ice bath to 5–10° and, while stirring strongly, 5 parts of terephthalic acid dichloride are added. After about 15 minutes, the polymer formed is precipitated by pouring the reaction solution into water and it is worked up as described in the above examples. It is insoluble in dimethyl acetamide, but it yields films from dimethyl sulphoxide solution which have a stress decay of 12%, a tensile recovery of 97%, a tenacity of 3.3 kg./sq. mm. and an elongation at break of 800%.

If, instead of the 8.7 parts of adipic acid dihydrazide mentioned above, equimolar amounts of dihydrazides given in Table 6 are used with otherwise the same procedure, then similar elastic polymers are obtained the properties of which are given in Table 6.

TABLE 6

| Bis-hydrazide | Elongation at break, percent | $\eta_{inh}$ | Tensile recovery, percent |
|---|---|---|---|
| 6b. Sebacic acid bis-hydrazide | 800–1,000 | 1.25 | 95 |
| 6c. 2,4-dihydrazino-6-dimethyl-amino-pyrimidine | 800–1,000 | 1.30 | 96 |
| 6d. Isophthalic acid bishydrazide | 500–700 | 1.48 | 97 |
| 6e. 2-methylamino-3-hydrazino-quinoxaline-6-carboxylic acid hydrazide | 500–6500 | 1.07 | 96 |

Example 7

2.4 parts of 2,4-dihydrazino-6-dipropylamino-s-triazine in 40 parts by volume of N-methyl pyrrolidone are condensed as described in Example 2 with 4.75 parts of poly-ε-caprolactone glycol bis-chloroformate and then chain extended with 1.01 parts of terephthalic acid dichloride.

The elastic polymer obtained has an inherent viscosity of 1.1 and yields highly elastic coatings from dimethyl formamide, dimethyl acetamide, dimethyl sulphoxide or N-methyl pyrrolidone solution.

The poly - ε - caprolactone glycol bis-chloroformate is produced as follows: ε-caprolactone is polymerised with ethylene glycol as starter according to Example 8 of U.S.

1 to 6 carbon atoms, halogen of an atomic number of at most 35 and carboxyl; benzyl; a grouping

wherein
each of $M_1$ and $M_2$ represents independently of the other hydrogen, alkyl of from 1 to 18 carbon atoms, benzyl, phenyl, alkenyl of from 3 to 12 carbon atoms, cyclohexyl, or N,N-dialkylamino alkyl, each alkyl having 1 to 6 carbon atoms, or
$M_1$ and $M_2$ taken together with the nitrogen atom to which they are linked, represent morpholino, pyrrolidino, piperidino, 4-lower alkyl-piperazino, hexamethylene-imino, 5H-dibenzo[b,f]azepinyl-(5) or thiomorpholino;
Z represents one of the two radicals of the formulas

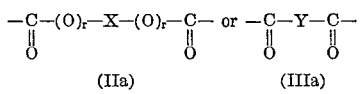

wherein
$r$ represents 0 or 1, and
X represents a divalent, essentially linear, radical which is the residue of a compound

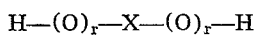

which has a molecular weight of from about 400 to 5000 and a melting point below 70° C., which radical X is a hydrocarbon radical, a halogenated hydrocarbon radical, an aliphatic polyether radical, an aliphatic polythioether radcal, a polyester radical, an aliphatic polyether thioether radical, a polyether ester radical or a polythioether ester radical whereby in the chains of X, an oxygen group, a sulfur group or the group

is separated from the nearest other such group by at least two chain carbon atoms,
any substitutents at carbon atoms of said chain being selected from halogen of an atomic number of at most 17 and alkyl, having 1 to 6 carbon atoms, and
Y represents
(a) a straight chain alkylene of at most 12 carbon atoms, cycloalkylene of from 5 to 8 carbon atoms, phenylene, diphenylene, naphthylene, or phenylene-E-phenylene, wherein E is a member selected from —O—, —S—, —SO$_2$—, alkylidene of at most 8 carbon atoms, or cycloalkylidene of from 5 to 7 carbon atoms, any substituents at carbon atoms of the aforesaid groups Y being selected from alkyl having 1 to 6 carbon atoms, halogen of an atomic number of at most 17, or carboxyl; or
(b) —O—R'—O—, wherein R' represents alkylene of from 2 to 12 carbon atoms or methylene-cyclohexylene-methylene; or
(c) 1,4-piperazinediyl; or
(d) —NH—R—NH— wherein R represents alkylene of from 2 to 12 carbon atoms, α,α'-xylylene, alkyl-α,α'-xylylene wherein alkyl has 1 to 6 carbon atoms, halogeno-α,α'-xylylene wherein "halogeno" has an atomic number of at most 17, cyclohexylene or methylene-cyclohexylene-methylene;
said polymer containing, per radical

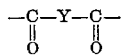

from 0.5 to 5 radicals

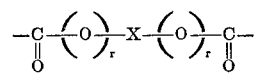

which are distributed at random over the whole polymer.

2. A polymer as defined in claim 1, wherein X represents a divalent linear, aliphatic polyether radical, an aliphatic polyester radical or an aliphatic polyether ester radical which consist of a terminal alkylene group of from 2 to 14 carbon atoms and a chain of $m$ identical or different units selected from

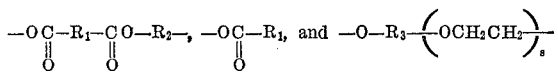

said chain being linked to said terminal alkylene group via its terminal oxygen atom,
$R_1$ representing an alkylene radical of from 4 to 12 carbon atoms, while
$R_2$ is an alkylene radical having from 2 to 14 carbon atoms at least two of which are in the said chain;
$R_3$ is selected from the groups

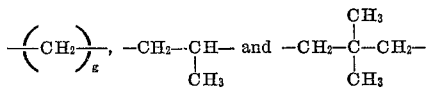

$g$ is an integer ranging from 3 to 6; and
$s$ represents 0 or 1;
$m$ beng an integer of such magnitude that a glycol consisting of —X— and two terminal hydroxyl groups has a molecular weight of from about 400 to 5000, the melting point of said glycol being below 70° C.; said polymer containing, per radical

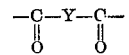

from 0.8 to 5 radicals

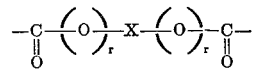

which are distributed at random over the whole polymer.

3. A polymer as defined in claim 1 wherein Q represents the aforesaid grouping

wherein $M_1$ and $M_2$ are as defined in claim 1.

4. A polymer as defined in claim 3, wherein Z represents one of the two radicals of the formulas

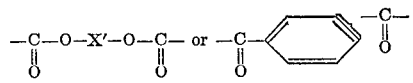

wherein
X' represents a divalent linear aliphatic polyether radical, an aliphatic polyester radical or an aliphatic polyether ester radical which consists of a terminal alkylene group of from 2 to 14 carbon atoms and a chain which consists of $m$ identical or different recurring units selected from the group consisting of

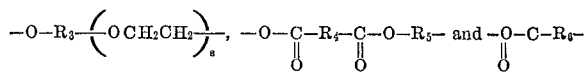

said chain being linked to said terminal alkylene group via its terminal oxygen atom,
$R_3$, $m$ and $s$ having the aforesaid meanings, while
$R_4$ represents alkylene of from 4 to 12 carbon atoms at least 4 of which are members of said chain,
$R_5$ represents

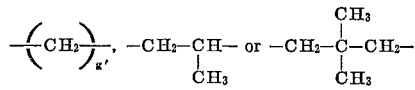

(e) (Polydodecylene-trimethyladipate).—188 parts of trimethyladipic acid, 222 parts of dodecanediol, 0.15 part of $Sb_2O_3$ and 130 parts by volume of benzene are treated as described in Example 9.

The resulting polyester has an OH number of 54 and an acid number of 0.8, from which a molecular weight of 2075 is calculated.

The bis-chloroformate is prepared therefrom as described in Example 1. Its chlorine content is 3.21%.

(f) Copoly-($\beta,\beta,\delta$-$\beta,\delta,\delta$-trimethyl - $\epsilon$ - caprolactone).— 200 parts of a mixture of $\beta,\beta,\delta$-trimethyl-$\epsilon$-caprolactone and $\beta,\delta,\delta$-trimethyl-$\epsilon$-caprolactone, which can be obtained from isophorone, and 6 parts of ethylene glycol are heated with 0.2 part of sodium at 180° under nitrogen and further treated as described in U.S. Pat. 3,186,971, Example 4.

The resulting polyester glycol is a viscous liquid with a hydroxyl number of 62. The calculated molecular weight is 1810.

The corresponding bis-chloroformate is prepared as described in Example 1; it contains 3.64% chlorine.

By using the above polyester glycol-bis-chloroformates (d), (e) and (f) in equivalent amounts in lieu of the 10.8 parts of the 1,2-propanediol/ethylene glycol copolyether bis-chloroformate in Example 10(a) and otherwise following the same procedure as given therein, similar elastic polymers are obtained, the properties of which are also listed in the table below.

TABLE

| Bis-chloroformate | Elongation at break, percent | $\eta_{inh}$. | Tensile recovery, percent |
|---|---|---|---|
| (b) | 600–700 | 1.40 | 89 |
| (c) | 700–800 | 1.75 | 94 |
| (d) | 300–400 | 0.98 | 87 |
| (e) | 800–1,000 | 1.05 | 91 |
| (f) | 600–800 | 1.14 | 91 |

Example 11

6.7 parts of poly(1,6-dioxa-9-thiaundecane)glycol bis-chloroformate with a molecular weight of 1320 and a chlorine content of 5.32% are reacted with a solution of 1.38 parts of 2,4-dihydrazino-6-dimethylamino-s-triazine in 40 parts by volume of dimethylacetamide, then chain-extended with 0.508 part of terephthalic acid dichloride and worked up as described in Example 2. The polymer obtained has an inherent viscosity of 0.65; elastic films made from this polymer by casting a dimethylacetamide solution exhibit a stress decay of about 30% and an elastic recovery of about 75.

The poly(1,6-dioxa-9-thiaundecane)-glycol is obtained as described in Swiss Pat. No. 404,959 as a viscous mass with a hydroxyl equivalent of about 600. This product is treated in an analogous manner with phosgene as described in Example 1 to yield the corresponding bis-chloroformate with a chlorine content of 5.32%.

Example 12

(a) Preparation of 2,4-dihydrazino-6-[2-diethylamino-ethylamino]-s-triazine.—In a suitable flask 184 parts of trichloro-s-triazine are suspended in 1000 parts by volume of methylene chloride and the mixture cooled to —10°. To this mixture, 116 parts of 2-dimethylamino-ethylamine are added dropwise while stirring and cooling to about —10° during twenty minutes. After addition of the amine the resulting slurry of the reaction product is stirred another 15 minutes at —5 to 0° and filtered. The filter cake is thoroughly compressed and without further drying is added portion-wise within 15 minutes to a stirred solution of 300 parts of hydrazine hydrate in 1200 parts by volume of dioxan. During addition the reaction temperature is kept by cooling between 20 and 40°. Thereafter the reaction mixture is refluxed for 3 hours with stirring, cooled to room temperature and stirred for another 2 hours. The resulting white precipitate is filtered off and washed with dioxan. Thereafter the product is slurried with 1000 parts by volume of dioxan and treated with a solution of 100 parts of sodium hydroxide in 250 parts by volume of water at a temperature of from 20 to 40°. After cooling the reaction product is filtered, washed with hexane and recrystallised several times from ethanol and ethanol-methylene chloride. Its melting point is then 122–124°.

(b) A polymer is prepared by the procedure described in Example 3, but replacing the 2.4 parts of 2,4-dihydrazino-6-di-n-propylamino-s-triazine and the 1.2 parts of 2,4-dihydrazino-6-diisopropylamino-s-triazine used therein by an equimolar amount of 2,4-dihydrazino-6-[2-diethyl-amino-ethylamino]-s-triazine. The films obtained by casting a dimethylacetamide solution of the polymer show a stress decay of 19% and a tensile recovery of 89%. In the presence of water, the films show a strong tendency to swell and can be used as coatings, the gradually increasing permeability of which in water is desired, e.g. for dragées and the like. A sample of film redissolved in m-cresol has an inherent viscosity of 1.77.

Example 13

13.25 parts of polyisobutylene glycol bis-chloroformate with an approximate molecular weight of 2650 dissolved in 80 parts by volume of benzene are added, while stirring vigorously, to a solution of 1.8 parts of 2,4-dihydrazino-6-di-n-propylamino-s-triazine in 80 parts by volume of dimethylacetamide. After stirring for five minutes 0.508 part of terephthalic acid dichloride is added and stirring continued until a polymer with an inherent viscosity of 0.67 is obtained. A tough, elastic film of this polymer is obtained by casting an m-cresol solution.

The polyisobutylene glycol bis-chloroformate employed is prepared in an analogous manner to that described in Example 1, except that the glycol is previously dissolved in benzene, which is removed after the reaction together with the excess phosgene and the resulting hydrochloric acid. The polyisobutylene glycol with a hydroxyl equivalent of 1260 and molecular weight of 2520 is obtained by the procedures given by E. B. Jones et al. "Journal of Polymer Science" part A, vol. 2, pp. 5313–5318 (1964) and W. H. Stubbs et al. "Journal of Polymer Science" part A–1, vol. 4, pp. 447–48 (1966).

Example 14

25 parts of polyisobutylene di-acid chloride with a molecular weight of approximately 2500 prepared in accordance with Example VII of U.S. Patent 3,044,989 to Shivers, are dissolved in 150 parts by volume of benzene and added to a vigorously mixed solution of 3.6 parts of 2,4-dihydrazino-6-di-n-propylamino-s-triazine in 100 parts by volume of dimethylacetamide. After stirring for five minutes 1.015 parts of terephthalic acid dichloride are added and stirring is continued until a polymer with an inherent viscosity of 0.73 is obtained. By casting a m-cresol solution of this polymer a tough, elastic film is obtained.

We claim:

1. An essentially linear elastic polymer having an inherent viscosity of at least 0.5, measured at 25° C. in a concentration of 0.5 g. polymer/100 ml. of m-cresol, consisting essentially of recurring units of the formula

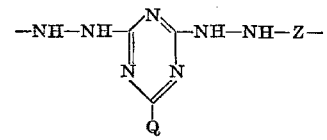

(I)

wherein

Q represents hydrogen; hydroxy; alkoxy of from 1 to 6 carbon atoms; alkyl of from 1 to 6 carbon atoms; cycloalkyl of from 5 to 8 carbon atoms or a phenyl radical any substituents of which are selected from alkyl, having 1 to 6 carbon atoms, alkoxy, having $R_6$ represents alkylene of from 5 to 11 carbon atoms at least 5 of which are members of said chain; and
$g'$ represents an integer ranging from 2 to 12;
said polymer containing, per radical

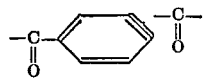

from 1 to 5 radicals

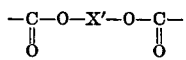

which are distributed at random over the whole polymer.

5. A polymer as defined in claim 1, wherein said recurring unit is of the formula

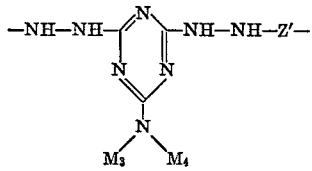

in which formula
each of $M_3$ and $M_4$ represents an alkyl radical of from 2 to 6 carbon atoms,
$Z'$ represents one of the two radicals of formulas

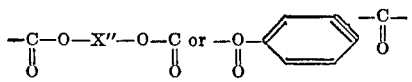

wherein
$X''$ represents a linear divalent polyglycolether radical which consists of a terminal alkylene group of from 2 to 14 carbon atoms and a chain which consists of $m'$ identical or different units $—O—R_3—$, said chain being linked to said terminal alkylene group via its terminal oxygen atom, and
$R_3$ having the aforesaid meaning;
$m'$ being an integer of such magnitude that each glycol consisting of $—X''—$ and two terminal hydroxyl groups has a molecular weight of from 800 to 2500 and a melting point below 70° C.;
said polymer containing, per radical

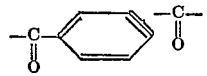

from 1 to 3 radicals

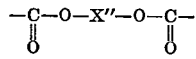

which are distributed at random over the whole polymer.

6. A polymer as defined in claim 5 wherein said recurring unit is of the formula

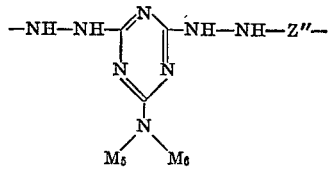

wherein
each of $M_5$ and $M_6$ represents alkyl of from 2 to 4 carbon atoms, and
$Z''$ represents one of the two radicals of formulas

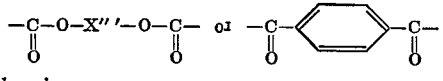

wherein
$X'''$ represents a linear divalent polyether radical which consists of a terminal alkylene group of from 2 to 14 carbon atoms, and a chain which consists of $m'$ identical or different recurring units selected from

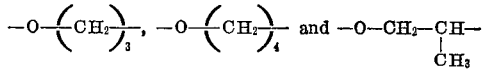

said chain being linked to said terminal alkylene group via its terminal oxygen atom, and
$m'$ having the aforesaid meaning;
said polymer containing per radical

from 1 to 2.5 radicals

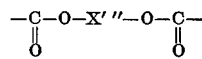

which are distributed at random over the whole polymer.

7. A polymer as defined in claim 6, wherein the melting point of said glycol of which X is a part, is below 50° C.

8. A polymer as defined in claim 6, wherein
each of $M_5$ and $M_6$ is ethyl,
each of the two terminal groups of $X'''$ is $(CH_2)_4$,
the recurring units of $X'''$ are of the formula $(CH_2)_4$,
the magnitude of $m'$ is such that the molecular weight of the respective glycol is about 2000,
and the second of the radicals represented by $Z''$ is the radical

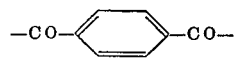

9. A polymer as defined in claim 8, wherein the molar ratio of the radical $—CO—O—X'''—O—CO—$ to the radical

is about 2:1.

10. A polymer as defined in claim 8, wherein the molar ratio of the radical $—CO—O—X'''—O—CO—$ to the radical

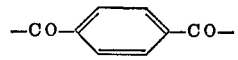

is about 3:2.

11. A polymer as defined in claim 6, wherein
each of $M_5$ and $M_6$ is propyl,
each of the two terminal groups of $X'''$ is $(CH_2)_4$,
the recurring units of $X'''$ are of the formula $(CH_2)_4$,
the magnitude of $m'$ is such that the molecular weight of the respective glycol is about 2000,
and the second of the radicals represented by $Z''$ is the radical

12. A polymer as defined in claim 11, wherein the molar ratio of the radical $—CO—O—X'''—O—CO—$ to the radical

is about 2:1.

13. A polymer as defined in claim 11, wherein the molar ratio of the radical $—CO—O—X'''—O—CO—$ to the radcial

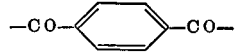

is about 3:2.

14. A polymer as defined in claim 6,
wherein each of $M_5$ and $M_6$ is ethyl,
each of the two terminal groups of $X'''$ is $(CH_2)_4$,
the recurring units of $X'''$ are of the formula $(CH_2)_4$, the magnitude of $m'$ is such that the molecular weight of the respective glycol is about 2000,
and the second of the radicals represented by $Z''$ is the radical

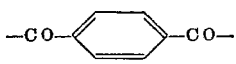

15. A polymer as defined in claim 14, wherein the molar ratio of the radical —CO—O—X'''—O—CO— to the radical

is about 2:1.

16. A polymer as defined in claim 14, wherein the molar ratio of the radical —CO—O—X'''—O—CO— to the radical

is about 3:2.

17. In a process for the production of a polymer as defined in claim 1, the steps of
(I) reacting a mixture (iii) of bis-hydrazides each of which falls under the formula

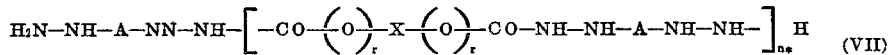

wherein
A is a divalent acyl radical of polybasic carboxylic acid,
X and $r$ have the same meanings as in Formula IIa of claim 1,
$n^*$ represents a number of the series of whole numbers consisting of zero and the natural numbers, and the arithmetic mean of all $n^*$ is equal to a number in the range of from 0.5 to 5, with, as chain-extending agent,
a bifunctional compound (iv) consisting of a central moiety Y which is
(a) a straight chain alkylene of at most 12 carbon atoms, cycloalkylene of from 5 to 8 carbon atoms, phenylene, diphenylene, naphthylene, or phenylene-E-phenylene, wherein E is a member selected from —O—, —S—,

alkylidene of at most 8 carbon atoms, or cycloalkylidene of from 5 to 7 carbon atoms, any substituents at carbon atoms of the aforesaid groups Y being selected from alkyl having 1 to 6 carbon atoms, halogen of an atomic number of at most 17, or carboxyl; or
(b) —O—R'—O—, wherein R' represents alkylene of from 2 to 12 carbon atoms or methylene - cyclohexylene-methylene; or
(c) 1,4-piperazinediyl;
or a moiety that is converted to such Y by the ensuing reaction, and two terminal groups linked to different carbon atoms of said Y, which terminal groups are selected from the monovalent grouping —CO—halogen, which is linked via its free bond to a carbon atom of said central moiety, and the divalent grouping —CO—O—CO— which is linked either with both free bonds to the same, or with each free bond to a different carbon atom of said central moiety; or with a bifunctional compound (iv') of the formula O=C=N—R—N=C=O wherein R represents alkylene of from 2 to 12 carbon atoms, α,α'-xylene, alkyl - α,α' - xylene wherein alkyl has 1 to 6 carbon atoms, halogeno-α,α'-xylylene wherein halogeno has an atomic number of at most 17, cyclohexylene or methylene - cyclohexylene - methylene; in a molar ratio of reactants (iii) to (iv) or to (iv'), respectively, which ranges from 0.9 to 1.1, at a temperature in the range of from —20° to +80° C. and in the presence of an organic solvent for said reactants (iii) and (iv) or (iv'), respectively, which solvent is inert under reaction condition, and for the final reaction product, thereby obtaining a solution of the latter in said solvent; and
(II) recovering said polymer as defined in claim 1 from the solution thereof in said solvent.

18. A process as defined in claim 17, wherein Y represents a divalent linear, aliphatic polyether radical, an aliphatic polyester radical or an aliphatic polyether ester radical, which consist of a terminal alkylene group of from 2 to 14 carbon atoms and a chain of $m$ identical or different units selected from

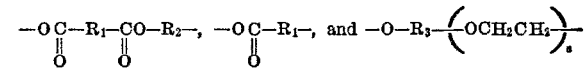

said chain being linked to said terminal alkylene group via its terminal oxygen atom,
$R_1$ representing an alkylene radical of from 4 to 12 carbon atoms, while
$R_2$ is an alkylene radical having from 2 to 14 carbon atoms at least two of which are in the said chain;
$R_3$ is selected from the groups

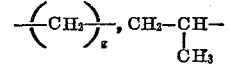

and

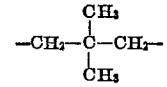

$g$ is an integer ranging from 3 to 6; and
$s$ represents 0 or 1;
$m$ being an integer of such magnitude that a glycol consisting of —X— and two terminal hydroxyl groups has a molecular weight of from about 400 to 5000, the melting point of said glycol being below 70° C.; and wherein the ratio of reactants (iii) to (iv) or to (iv'), respectively, ranges from 0.9 to 1.1.

19. A process as defined in claim 18, wherein X represents a divalent linear aliphatic polyether radical, an aliphatic polyester radical or an aliphatic polyether ester radical which consists of a terminal alkylene group of from 2 to 14 carbon atoms and a chain which consists of $m$ identical or different recurring units selected from

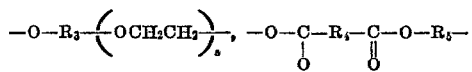

and

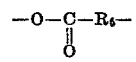

said chain being linked to said terminal alkylene group via its terminal oxygen atom, $R_3$, $m$ and $s$ having the aforesaid meanings, while
$R_4$ represents alkylene of from 4 to 12 carbon atoms at least 4 of which are members of said chain,
$R_5$ represents $$-(CH_2)_{g'}-,\quad -CH_2-CH-\quad \text{or}\quad -CH_2-\underset{\underset{CH_3}{|}}{\overset{\overset{CH_3}{|}}{C}}-CH_2-$$
$$\phantom{-(CH_2)_{g'}-,\quad -CH_2}\underset{CH_3}{|}$$

$R_6$ represents alkylene of from 5 to 11 carbon atoms at least 5 of which are members of said chain; and
$g'$ represents an integer ranging from 2 to 12;
Q represents the grouping $$-N\begin{matrix}\nearrow M_1\\ \searrow M_2\end{matrix}$$

wherein
$M_1$ and $M_2$ are as defined in claim 1, and said bifunctional compound is one of the formulas $$\text{Hal}-\underset{O}{\overset{\phantom{|}}{C}}-\!\!\langle\!\!\!\bigcirc\!\!\!\rangle\!\!-\underset{O}{\overset{\phantom{|}}{C}}-\text{Hal}$$

and $$\text{Hal}-\underset{O}{\overset{\phantom{|}}{C}}-\!\!\langle\!\!\!\bigcirc\!\!\!\rangle\!\!-(E)_n-\!\!\langle\!\!\!\bigcirc\!\!\!\rangle\!\!-\underset{O}{\overset{\phantom{|}}{C}}-\text{Hal}$$

wherein
Hal represents halogen, the molar ratio of (iii) to said bifunctional compound ranging from 0.9 to 1.1,
E represents a member selected from —O—, —S—, —SO$_2$—, alkylidene of at most 8 carbon atoms and cycloalkylidene of from 5 to 7 carbon atoms, and
$n$ represents 0 or 1.

20. A process as defined in claim 19, wherein said bifunctional compound is terephthalic acid dichloride.

21. A process as defined in claim 19, wherein said bifunctional compound is isophthalic acid dichloride.

22. A process as defined in claim 17, wherein said bifunctional compound is 2,6-naphthalene-dicarboxylic acid dichloride.

23. A process as defined in claim 17, wherein said bifunctional compound is 4,4'-diphenyl-dicarboxylic acid dichloride.

24. A process as defined in claim 19, wherein
X represents a linear divalent polyglycolether radical which consists of a terminal alkylene group of from 2 to 14 carbon atoms and a chain which consists of $m'$ identical or different recurring units —O—R$_3$—, said chain being linked to said terminal alkylene group via its terminal oxygen atom, and
$R_3$ having the aforesaid meaning;
$m'$ being an integer of such magnitude that each glycol consisting of —X— and two terminal hydroxyl groups has a molecular weight of from 800 to 2500 and a melting point below 70° C.; and
Q represents the grouping $$-N\begin{matrix}\nearrow M_3\\ \searrow M_4\end{matrix}$$

wherein each of $R_3$ and $R_4$ is alkyl of from 2 to 6 carbon atoms; and the molar ratio of (iii) to said bifunctional compound ranges from 0.9 to 1.1.

25. A process as defined in claim 24, wherein said bifunctional compound is terephthalic acid dichloride.

26. A process as defined in claim 24, wherein said bifunctional compound is naphthalene-2,6-dicarboxylic acid dichloride.

27. A process as defined in clami 24, wherein said bifunctional compound is diphenyl-4,4-dicarboxylic acid dicholride.

28. A process as described in claim 19, wherein
X represents a linear divalent polyether radical which consists of a terminal alkylene group of from 2 to 14 carbon atoms, and a chain which consists of $m'$ identical or different recurring units selected from $$-O-(CH_2)_3-,\quad -O-(CH_2)_4-\quad \text{and}\quad -O-CH_2-\underset{\underset{CH_3}{|}}{CH}-$$

said chain being linked to said terminal alkylene group via its terminal oxygen atom, and
Q represents $$-N\begin{matrix}\nearrow M_5\\ \searrow M_6\end{matrix}$$

wherein each of $M_5$ and $M_6$ represents alkyl of from 2 to 4 carbon atoms, and the molar ratio of (iii) to said bifunctional compound ranges from 0.9 to 1.1.

29. A process as defined in claim 28, wherein said bifunctional compound is terephthalic acid dichloride.

30. A process as defined in claim 28, wherein said bifunctional compound is naphthalene-2,5-dicarboxylic acid dichloride.

31. A process as defined in claim 28, wherein said bifunctional compound is diphenyl-4,4'-dicarboxylic acid dichloride.

32. An elastic film of a polymer as defined in claim 1.

33. A filament produced from a polymer as defined in claim 1.

34. A coating of a polymer as defined in claim 1 on a substrate.

References Cited

UNITED STATES PATENTS

| | | | |
|---|---|---|---|
| 2,615,862 | 10/1952 | McFarlane et al. | 260—78 |
| 3,130,182 | 4/1964 | Frazer | 260—78 |
| 3,432,456 | 3/1969 | Oertel et al. | 260—30.2 |
| 3,461,106 | 8/1969 | Oertel et al. | 260—75 |

FOREIGN PATENTS

| | | | |
|---|---|---|---|
| 669,749 | 9/1963 | Canada | 260—77.5 |

WILLIAM H. SHORT, Primary Examiner

L. L. LEE, Assistant Examiner

U.S. Cl. X.R.

260—132 B, 138.8 A, 142, 148, 155 R, 30.2, 30.4, N, 30.8 R, 32.6 N, 33.2 R, 33.8 UB, 47 CZ, 47 CB, 47 CP, 77.5 C, 77.5 SP 77.5 AM, 77.5 CH, 78 R